US012723497B2

(12) United States Patent
Janssen et al.

(10) Patent No.: US 12,723,497 B2
(45) Date of Patent: Sep. 1, 2026

(54) MONITORING AND PERFORATING SYSTEM AND METHOD COMBINING PLUG AND PERFORATION OPERATION WITH DISTRIBUTED ACOUSTIC SENSING

(71) Applicant: Borehole Seismic, LLC., Houston, TX (US)

(72) Inventors: Aaron Janssen, Houston, TX (US); Phillip Chen, Houston, TX (US); Robinson Butler Howell, Houston, TX (US)

(73) Assignee: Borehole Seismic, LLC., Houston, TX (US)

(*) Notice: Subject to any disclaimer, the term of this patent is extended or adjusted under 35 U.S.C. 154(b) by 0 days.

(21) Appl. No.: 18/204,938

(22) Filed: Jun. 1, 2023

(65) Prior Publication Data

US 2024/0141761 A1 May 2, 2024

Related U.S. Application Data

(60) Provisional application No. 63/497,798, filed on Apr. 24, 2023, provisional application No. 63/483,632, filed on Feb. 7, 2023, provisional application No. 63/348,896, filed on Jun. 3, 2022.

(51) Int. Cl.

| | |
|---|---|
| ***E21B 43/119*** | (2006.01) |
| ***E21B 43/26*** | (2006.01) |
| ***E21B 47/002*** | (2012.01) |
| ***E21B 47/135*** | (2012.01) |
| ***G01V 1/22*** | (2006.01) |

(52) U.S. Cl.

CPC ............ *E21B 43/119* (2013.01); *E21B 43/26* (2013.01); *E21B 43/2607* (2020.05); *E21B 47/002* (2020.05); *E21B 47/135* (2020.05); *G01V 1/226* (2013.01); *G01V 2210/1234* (2013.01)

(58) Field of Classification Search

CPC .... E21B 43/119; E21B 43/26; E21B 43/2607; E21B 47/135

See application file for complete search history.

(56) References Cited

U.S. PATENT DOCUMENTS

| | | | | |
|---|---|---|---|---|
| 2009/0114392 A1* | 5/2009 | Tolman | .................. | E21B 43/25 166/305.1 |
| 2015/0135819 A1* | 5/2015 | Petrella | .................... | G01V 1/52 73/152.58 |
| 2020/0072995 A1* | 3/2020 | Milne | ............... | G01D 5/35316 |
| 2021/0025267 A1* | 1/2021 | Christie | .............. | E21B 43/2607 |

* cited by examiner

*Primary Examiner* — Caroline N Butcher

(74) *Attorney, Agent, or Firm* — Glen P. Belvis; Belvis Law, LLC.

(57) ABSTRACT

A system for treating a plurality of adjacent wells having casing includes a wireline, perforating equipment, and a fiber-optic interrogator. A fiber-optic interrogator is configured to interrogate the at least one optical fiber for distributed acoustic sensing. The wireline deployed in a well with the perforating gun can remain in the well, while an adjacent well is stimulated to produce hydraulic fracture. During the stimulation, the fiber-optic wireline is used for distributed acoustic sensing during the fracture operation of the adjacent well. A zipper fracture operation between adjacent wells can use multiple systems in conjunction with pumping equipment to monitor the fracture operations in real-time and obtain imaging and seismic information of the fracture network.

21 Claims, 17 Drawing Sheets

MONITORING AND PERFORATING SYSTEM AND METHOD COMBINING PLUG AND PERFORATION OPERATION WITH DISTRIBUTED ACOUSTIC SENSING

This application: (i) claims priority to and under 35 U.S.C. § 119(e)(1) the benefit of the filing date of U.S. provisional application Ser. No. 63/348,896 filed Jun. 3, 2022; (ii) claims priority to and under 35 U.S.C. § 119(e)(1) the benefit of the filing date of U.S. provisional application Ser. No. 63/483,632 filed Feb. 7, 2023; and (iii) claims priority to and under 35 U.S.C. § 119(e)(1) the benefit of the filing date of U.S. provisional application Ser. No. 63/497,798 filed Apr. 24, 2023, the entire disclosure of each of which is incorporated herein by reference.

BACKGROUND OF THE INVENTION

Field of the Invention

The present inventions relate to systems, methods and devices for perforating wells, hydraulic fracturing of formations and monitoring and conducting such activities, including monitoring and controlling such activities, generally, and preferably in real-time, including real-time during fracturing operations.

In the production of natural resources from formations within the earth a well or borehole is drilled into the earth to the location where the natural resource is believed to be located. These natural resources may be a hydrocarbon reservoir, containing natural gas, crude oil and combinations of these; the natural resource may be fresh water; it may be a heat source for geothermal energy; or it may be some other natural resource that is located within the ground.

These resource-containing formations may be a few hundred feet, a few thousand feet, or tens of thousands of feet below the surface of the earth, including under the floor of a body of water, e.g., below the sea floor. In addition to being at various depths within the earth, these formations may cover areas of differing sizes, shapes and volumes.

Unfortunately, and generally, when a well is drilled into these formations the natural resources rarely flow into the well at rates, durations and amounts that are economically viable. This problem occurs for several reasons, some of which are well understood, others of which are not as well understood, and some of which may not yet be known. These problems can relate to the viscosity of the natural resource, the porosity of the formation, the geology of the formation, the formation pressures, and the perforations that place the production tubing in the well in fluid communication with the formation, to name a few.

Typically, and by way of general illustration, in drilling a well an initial borehole made into the earth, e.g., the surface of land or seabed, and then subsequent and smaller diameter boreholes are drilled to extend the overall depth of the borehole. In this manner as the overall borehole gets deeper its diameter becomes smaller; resulting in what can be envisioned as a telescoping assembly of holes with the largest diameter hole being at the top of the borehole closest to the surface of the earth.

Thus, by way of example, the starting phases of a subsea drill process may be explained in general as follows. Once the drilling rig is positioned on the surface of the water over the area where drilling is to take place, an initial borehole is made by drilling a 36" hole in the earth to a depth of about 200-300 ft. below the seafloor. A 30" casing is inserted into this initial borehole. This 30" casing may also be called a conductor. The 30" conductor may or may not be cemented into place. During this drilling operation a riser is generally not used and the cuttings from the borehole, e.g., the earth and other material removed from the borehole by the drilling activity are returned to the seafloor. Next, a 26" diameter borehole is drilled within the 30" casing, extending the depth of the borehole to about 1,000-1,500 ft. This drilling operation may also be conducted without using a riser. A 20" casing is then inserted into the 30" conductor and 26" borehole. This 20" casing is cemented into place. The 20" casing has a wellhead secured to it. (In other operations an additional smaller diameter borehole may be drilled, and a smaller diameter casing inserted into that borehole with the wellhead being secured to that smaller diameter casing.) A BOP (blow out preventer) is then secured to a riser and lowered by the riser to the sea floor; where the BOP is secured to the wellhead. From this point forward all drilling activity in the borehole takes place through the riser and the BOP.

It should be noted that riserless subsea drilling operations are also contemplated.

For a land-based drill process, the steps are similar, although the large diameter tubulars, 30"-20" are typically not used. Thus, and generally, there is a surface casing that is typically about 13⅜" diameter. This may extend from the surface, e.g., wellhead and BOP, to depths of tens of feet to hundreds of feet. One of the purposes of the surface casing is to meet environmental concerns in protecting ground water. The surface casing should have sufficiently large diameter to allow the drill string, product equipment such as ESPs and circulation mud to pass through. Below the casing one or more different diameter intermediate casings may be used. (It is understood that sections of a borehole may not be cased, which sections are referred to as open hole.) These can have diameters in the range of about 9" to about 7", although larger and smaller sizes may be used, and can extend to depths of thousands and tens of thousands of feet. Inside of the casing and extending from a pay zone, or production zone of the borehole up to and through the wellhead on the surface is the production tubing. There may be a single production tubing or multiple production tubings in a single borehole, with each of the production tubing endings being at different depths.

Typically, when completing a well, it is necessary to perform a perforation operation, and perform a hydraulic fracturing, or fracing operation. In general, when a well has been drilled and casing, e.g., a metal pipe, is run to the prescribed depth, the casing is typically cemented in place by pumping cement down and into the annular space between the casing and the earth. (It is understood that many different downhole casing, open hole, and completion approaches may be used.) The casing, among other things, prevents the hole from collapsing and fluids from flowing between permeable zones in the annulus. Thus, this casing forms a structural support for the well and a barrier to the earth.

While important for the structural integrity of the well, the casing and cement present a problem when they are in the production zone. Thus, in addition to holding back the earth, they also prevent the hydrocarbons from flowing into the well and from being recovered. Additionally, the formation itself may have been damaged by the drilling process, e.g., by the pressure from the drilling mud, and this damaged area of the formation may form an additional barrier to the flow of hydrocarbons into the well. Similarly, in most situations where casing is not needed in the production area, e.g., open hole, the formation itself is generally tight, and more typically can be very tight, and thus, will not permit the hydrocarbons to flow into the well. In some situations the formation pressure is large enough that the hydrocarbons readily flow into the well in an uncased, or open hole. Nevertheless, as formation pressure lessens a point will be reached where the formation itself shuts-off, or significantly reduces, the flow of hydrocarbons into the well. Also, such low formation pressure could have insufficient force to flow fluid from the bottom of the borehole to the surface, requiring the use of artificial lift.

To address, in part, this problem of the flow of hydrocarbons (as well as other resources, e.g., geothermal) into the well being blocked by the casing, cement and the formation itself, openings, e.g., perforations, are made in the well in the area of the pay zone. Generally, a perforation is a small, about ¼ "to about 1" or 2" in diameter hole that extends through the casing, cement and damaged formation and goes into the formation. This hole creates a passage for the hydrocarbons to flow from the formation into the well. In a typical well, a large number of these holes are made through the casing and into the formation in the pay zone.

Generally, in a perforating operation a perforating tool or gun is lowered into the borehole to the location where the production zone or pay zone is located. The perforating gun is a long, typically round tool, that has a small enough diameter to fit into the casing or tubular and reach the area within the borehole where the production zone is believed to be. Once positioned in the production zone a series of explosive charges, e.g., shaped charges, are ignited. The hot gases and molten metal from the explosion cut a hole, i.e., the perf or perforation, through the casing and into the formation. These explosive-made perforations extend a few inches, e.g., 6" to 18" into the formation.

The ability of, or ease with which, the natural resource can flow out of the formation and into the well or production tubing (into and out of, for example, in the case of engineered geothermal wells, and some advanced recovery methods for hydrocarbon wells) can generally be understood as the fluid communication between the well and the formation. As this fluid communication is increased several enhancements or benefits may be obtained: the volume or rate of flow (e.g., gallons per minute) can increase; the distance within the formation out from the well where the natural resources will flow into the well can be increase (e.g., the volume and area of the formation that can be drained by a single well is increased, and it will thus take less total wells to recover the resources from an entire field); the time period when the well is producing resources can be lengthened; the flow rate can be maintained at a higher rate for a longer period of time; and combinations of these and other efficiencies and benefits.

Fluid communication between the formation and the well can be greatly increased by the use of hydraulic fracturing techniques. The first uses of hydraulic fracturing date back to the late 1940s and early 1950s. In general, hydraulic fracturing treatments involve forcing fluids down the well and into the formation, where the fluids enter the formation and crack, e.g., force the layers of rock to break apart or fracture. These fractures create channels or flow paths that may have cross sections of a few micron's, to a few millimeters, to several millimeters in size, and potentially larger. The fractures may also extend out from the well in all directions for a few feet, several feet and tens of feet or further. It should be remembered that the longitudinal axis of the well in the reservoir may not be vertical: it may be on an angle (either slopping up or down) or it may be horizontal. For example, in the recovery of shale gas and oil the wells are typically essentially horizontal in the reservoir. The section of the well located within the reservoir, i.e., the section of the formation containing the natural resources, can be called the pay zone.

Typical fluid volumes in the initial propped fracturing treatment of a formation in general can range from a few thousand to a few million gallons. This initial hydraulic fracturing operation can have several phases, each having different volumes of fluids, pressures and amounts of proppant. These initial propped fracturing treatments take place during the competition phase of the well, before or as it goes "on line" to become a producing well. Although in other types of completions the wells may only be hydraulically fractured and no proppant is used. In general, the objective of hydraulic fracturing is to create and enhance fluid communication between the wellbore and the hydrocarbons in the formation, e.g., the reservoir.

The fluids used to perform the initial hydraulic fracture, i.e., during the completion phase, can range from very simple, e.g., water, to very complex. Additionally, these fluids, e.g., fracing fluids or fracturing fluids, typically carry with them proppants; but not in all cases, e.g., when acids are used to fracture carbonate formations. Proppants are small particles, e.g., grains of sand, aluminum shot, sintered bauxite, ceramic beads, resin coated sand or ceramics, that are flowed into the fractures and hold, e.g., "prop" or hold open the fractures when the pressure of the fracturing fluid is reduced and the fluid is removed to allow the resource, e.g., hydrocarbons, to flow into the well.

In this manner the proppants hold open the fractures, keeping the channels open so that the hydrocarbons can more readily flow into the well. Additionally, the fractures greatly increase the surface area from which the hydrocarbons can flow into the well. Proppants may not be needed, or generally may not be used when acids are used to create a frac and subsequent channel in a carbonate rich reservoir, where the acids dissolve part or all of the rock leaving an opening for the formation fluids to flow to the wellbore.

To extract oil and gas, hydraulic fracturing is used to break up the formation rock so hydrocarbons can be produced. Perforating tools, e.g., perforating guns to create holes or perforations in the casing are advanced into a well, such as, by using wireline to pump down the perforating gun. Fracture fluid and proppant are then pumped down the borehole to the perforations to create hydraulic fractures in the formation to allow hydrocarbons to flow. The amount of fluid, proppant, and pressures required to fracture the formation are based on, among other things, reservoir modeling and the understanding of the rock mechanics.

In typical prior techniques, a dedicated offset monitor well can be used to monitor the growth of fractures produced in a treatment well. These offset monitoring well systems and techniques have several problems and disadvantages. In these offset monitoring well techniques fiber optics or geophone arrays can be temporarily deployed in the monitor well. Alternatively, permanent fiber can be installed during the construction of the monitor well. Unfortunately, the offset monitor wells must be planned and drilled ahead of fracture operations. Some monitor wells may be too far from the fracture location to observe the fractures, and they may not be available to monitor fracture operations in the desired treatment well. These and other disadvantages and inefficiencies, when developing a field and in particular a large field have been a long-standing problem with such dedicated offset monitoring wells and techniques.

Modern completion methods can involve fracturing multiple wells to improve efficiency and reduce costs. Zipper fracturing operations are one example of such methods to complete two, or more, wells by alternating the perforation and stimulation steps between fracture stages. Typically, prior to the present inventions, to monitor fractures between the ing wells, dedicated monitoring wells were typically required. These monitoring wells had, for example, fiber optics and were pre-planned and pre-constructed. These monitor or offset wells must be equipped with downhole instrumentation, such as geophones or deployable fiber optics if permanent fiber is not available. Without permanent fiber installed in the treatment wells or nearby monitor wells available, the monitoring of fractures is unattainable. The inability to monitor the development of a field, such as when fracturing operations are used, has been a long-standing problem, that among other things, has led to the inability to obtain important well planning and fracturing data and information on an economical basis, and resulted in inefficiencies in the development of these fields.

Unconventional oil and gas wells can require massive hydraulic fracture stimulation treatments to be productive. Therefore, effective stimulation design and efficient execution of these hydraulic fracture stimulations are beneficial for the successful development of unconventional oil and gas resources. Completion engineers typically experiment with different stimulation designs in a trial-and-error methodology and evolve designs toward the parameters that, throughout the optimization process, have been shown to result in the most effective and efficient production of hydrocarbons from the reservoir, such as initial flow, return on capital invested, or other production and financial metrics.

Typically, different stimulation designs can ultimately impact the production of the well in different ways because the designed stimulations create different types, shapes, and sizes of hydraulic fracturing. Further, successful stimulation typically focuses the fracturing and deliver proppant to the part of the formation with the highest density of hydrocarbons, and that the horizontal and vertical extents of the stimulated region need to be appropriate for the vertical and lateral spacing between neighboring wells.

The widespread use and adoption of prior diagnostics that accurately map the development of the fractures in the subsurface, and these tools, although potentially useful in the completion design and refinement of field scale development strategy, have not seen widespread application, in part, due to the costs and inefficiencies associated with these prior diagnostics. This has created significant problems, where important data and information, that might be obtained, is not. The failure to obtain this data, and in particular, to obtain this data on a widespread and systematic basis, has long term determinantal implications for the efficient development and recovery of hydrocarbons, geothermal energy, and other natural resources. The present inventions, among other things, address and overcome this long-standing problem.

In general, oil-bearing rock formations are typically complex, horizontally layered composite earth materials. The response of these formations to hydraulic fracturing stimulation is highly complex and dynamic. Small changes in initial conditions (e.g., details of facture initiation points with respect to the details of the rock layering, or the changes in confining stress, or the emplacement of fractures, as a result of proximity to earlier nearby stimulation treatments) are sufficient to cause profound variations in the ultimate type, shape, and size of the fracturing generated.

This natural variation in subsurface results arising from repeated trials of nearly identical stimulation designs implies that to be meaningful to the completion optimization process, many wells must be observed and inferences about the type, size, and shape of fracturing must be made statistically over repeated trials.

Prior, fracture diagnostic tools require specialized and dedicated equipment and work processes to be integrated into the stimulation operations, well construction or both. Incremental cost, complexity, and operational risk associated with the instrumentation and measurement required for fracture diagnostics are often viewed as an impediment to the ultimate goal of more effective and operationally efficient completion designs. Thus, the prior systems have significant problems in their commercial, e.g., economical, use, resulting the significant problem and detrimental implication of not obtaining fracturing data and information.

Additionally, several of prior diagnostic tools, do not provide the level of accuracy that is needed. For, example, one type of fracture diagnostic tool uses computer modeling to determine fracture growth. However, computer software may not model fracture growth accurately enough for it to be a useful tool for stimulation design.

Another type of fracture diagnostic tool uses microseismic analysis. Microseismic is a well-established and effective technique for fracture mapping. Microseismic surveys are conventionally acquired by deploying dedicated geophysical sensing equipment into a downhole environment. This requires accessing additional wells other than the well that is being stimulated, building geophysical sensing equipment into the original well construction, or deploying large numbers of sensors over the earth's surface above the stimulated well. These previous methods require dedicated equipment, operations, costs, and risks beyond what is required to stimulate the well and are, therefore, difficult to justify on more than a few wells in the overall development program. Thus, these tools and methods suffer from similar significant problems in their commercial, e.g., economical, use, resulting the significant problem and detrimental implication of not obtaining fracturing data and information.

Another type of fracture diagnostic tool looks at inflow profiling and cluster efficiency. In pursuit of operational efficiency, a common design objective for completion engineers is to treat as many perforation clusters in a single stage of pumping as possible. Limits to the number of clusters per stage arise when the amount of proppant, fracture fluid or both that ends up in each perf cluster becomes uneven. Several diagnostic methods have been developed that aim to measure the relative amount of proppant and fracture fluid that each perforation cluster receives.

One technique to assess cluster efficiency requires deploying electro-optical or ultrasonic imaging tools into the well after stimulation. Detailed images of the perforations in the casing, through which high volumes of proppant and fracture fluid have been pumped typically show enlargement known as "perf erosion" that can be analyzed to obtain relative estimates of how much proppant has moved through each pert. These tools and methods, however, suffer from similar significant problems in their commercial, e.g., economical, use, resulting the significant problem and detrimental implication of not obtaining fracturing data and information.

A second technique to assess cluster efficiency requires the installation of a fiber optic cable behind the well's casing during the construction of the well. During stimulation, this fiber optic cable is used to measure acoustic noise levels at an array of "virtual sensor" locations covering the active perforated interval. These measurements can also be analyzed to obtain relative estimates of how much proppant has moved through each perforation. A key disadvantage of this method is that it relies on oversimplified and generally inaccurate assumptions about how fracturing develops in the formation and what types of fracture geometry are preferred. A further disadvantage is that it requires dedicated equipment, operations, costs, and risks beyond what is required to stimulate the well and were therefore difficult to justify on more than a few wells in the overall development program. Moreover, these tools and methods, however, suffer from similar significant problems in their commercial, e.g., economical, use, resulting the significant problem and detrimental implication of not obtaining fracturing data and information.

Production diagnostics offers another way to try different designs on the same well. A tool can then be used to measure production per stage, which can help select the designs that produce the best production measurements. This diagnostic approach fails for two reasons. First, the diagnostic approach is very difficult, and measuring the inflow profile of a low-rate multi-phase lateral well can be very expensive. This is true both operationally and from a data analysis standpoint. Second, there is a large natural and expected variation of fracturing that can occur. Therefore, production between neighboring stages can vary even when the completion design is held constant. Moreover, these tools and methods, however, suffer from similar significant problems in their commercial, e.g., economical, use, resulting the significant problem and detrimental implication of not obtaining fracturing data and information.

Another method of fracture diagnostics uses fracture mapping while drilling. This diagnostic approach attempts to map the fracturing generated by stimulation of a particular well by drilling a second neighboring well(s) after stimulation of the target well. The second well is then used to make various measurements while drilling that are designed to detect when the drilling well crosses fractures. This method requires drilling a second well in position to intersect the produced fractures in the target well, usually soon after stimulation of the target well. Standard practice is to batch drill and complete two to ten well pads in single drilling and completion events. Subsurface safety concerns prohibit simultaneous drilling and stimulation operations from the same pad, and drilling of additional wells solely for observation purposes is too expensive to be practical or may lead to sequencing suboptimal for the field development. Moreover, these tools and methods, however, suffer from similar significant problems in their commercial, e.g., economical, use, resulting the significant problem and detrimental implication of not obtaining fracturing data and information.

The present inventions, among other things, address, mitigate and overcome one or more, and all of the problems with prior techniques and systems, including those set forth above.

Related Art and Terminology

As used herein, unless specified otherwise, the terms “hydrocarbon exploration and production”, “exploration and production activities”, “E&P”, and “E&P activities”, and similar such terms are to be given their broadest possible meaning, and include surveying, geological analysis, well planning, reservoir planning, reservoir management, drilling a well, workover and completion activities, hydrocarbon production, flowing of hydrocarbons from a well, collection of hydrocarbons, secondary and tertiary recovery from a well, the management of flowing hydrocarbons from a well, and any other upstream activities.

As used herein, unless specified otherwise, the term “earth” should be given its broadest possible meaning, and includes, the ground, all natural materials, such as rocks, and artificial materials, such as concrete, that are or may be found in the ground.

As used herein, unless specified otherwise “offshore” and “offshore drilling activities” and similar such terms are used in their broadest sense and would include drilling activities on, or in, any body of water, whether fresh or salt water, whether manmade or naturally occurring, such as for example rivers, lakes, canals, inland seas, oceans, seas, such as the North Sea, bays and gulfs, such as the Gulf of Mexico. As used herein, unless specified otherwise the term “offshore drilling rig” is to be given its broadest possible meaning and would include fixed towers, tenders, platforms, barges, jack-ups, floating platforms, drill ships, dynamically positioned drill ships, semi-submersibles and dynamically positioned semi-submersibles. As used herein, unless specified otherwise the term “seafloor” is to be given its broadest possible meaning and would include any surface of the earth that lies under, or is at the bottom of, any body of water, whether fresh or salt water, whether manmade or naturally occurring.

As used herein, unless specified otherwise, the term “borehole” should be given it broadest possible meaning and includes any opening that is created in the earth that is substantially longer than it is wide, such as a well, a well bore, a well hole, a micro hole, a slimhole and other terms commonly used or known in the arts to define these types of narrow long passages. Wells would further include exploratory, production, abandoned, reentered, reworked, and injection wells. They would include both cased and uncased wells, and sections of those wells. Uncased wells, or section of wells, also are called open holes, or open hole sections. Boreholes may further have segments or sections that have different orientations, they may have straight sections and arcuate sections and combinations thereof. Thus, as used herein unless expressly provided otherwise, the “bottom” of a borehole, the “bottom surface” of the borehole and similar terms refer to the end of the borehole, i.e., that portion of the borehole furthest along the path of the borehole from the borehole’s opening, the surface of the earth, or the borehole’s beginning. The terms “side” and “wall” of a borehole should to be given their broadest possible meaning and include the longitudinal surfaces of the borehole, whether or not casing or a liner is present, as such, these terms would include the sides of an open borehole or the sides of the casing that has been positioned within a borehole. Boreholes may be made up of a single passage, multiple passages, connected passages, (e.g., branched configuration, fishboned configuration, or comb configuration), and combinations and variations thereof.

As used herein, unless specified otherwise, the term “advancing a borehole”, “drilling a well”, and similar such terms should be given their broadest possible meaning and include increasing the length of the borehole. Thus, by advancing a borehole, provided the orientation is not horizontal and is downward, e.g., less than 90, the depth of the borehole may also be increased.

Boreholes are generally formed and advanced by using mechanical drilling equipment having a rotating drilling tool, e.g., a bit. For example, and in general, when creating a borehole in the earth, a drilling bit is extending to and into the earth and rotated to create a hole in the earth. To perform the drilling operation the bit must be forced against the material to be removed with a sufficient force to exceed the shear strength, compressive strength or combinations thereof, of that material. The material that is cut from the earth is generally known as cuttings, e.g., waste, which may be chips of rock, dust, rock fibers and other types of materials and structures that may be created by the bit's interactions with the earth. These cuttings are typically removed from the borehole by the use of fluids, which fluids can be liquids, foams or gases, or other materials know to the art.

The true vertical depth ("TVD") of a borehole is the distance from the top or surface of the borehole to the depth at which the bottom of the borehole is located, measured along a straight vertical line. The measured depth ("MD") of a borehole is the distance as measured along the actual path of the borehole from the top or surface to the bottom. As used herein unless specified otherwise the term depth of a borehole will refer to MD. In general, a point of reference may be used for the top of the borehole, such as the rotary table, drill floor, well head or initial opening or surface of the structure in which the borehole is placed.

As used herein, unless specified otherwise, the term "drill pipe" is to be given its broadest possible meaning and includes all forms of pipe used for drilling activities; and refers to a single section or piece of pipe. As used herein the terms "stand of drill pipe," "drill pipe stand," "stand of pipe," "stand" and similar type terms should be given their broadest possible meaning and include two, three or four sections of drill pipe that have been connected, e.g., joined together, typically by joints having threaded connections. As used herein the terms "drill string," "string," "string of drill pipe," string of pipe" and similar type terms should be given their broadest definition and would include a stand or stands joined together for the purpose of being employed in a borehole. Thus, a drill string could include many stands and many hundreds of sections of drill pipe.

As used herein, unless specified otherwise, the terms "workover," "completion" and "workover and completion" and similar such terms should be given their broadest possible meanings and would include activities that take place at or near the completion of drilling a well, activities that take place at or the near the commencement of production from the well, activities that take place on the well when the well is a producing or operating well, activities that take place to reopen or reenter an abandoned or plugged well or branch of a well, and would also include for example, perforating, cementing, acidizing, fracturing, pressure testing, the removal of well debris, removal of plugs, insertion or replacement of production tubing, forming windows in casing to drill or complete lateral or branch wellbores, cutting and milling operations in general, insertion of screens, stimulating, cleaning, testing, analyzing and other such activities.

As used herein, unless specified otherwise, the terms "formation," "reservoir," "pay zone," and similar terms, are to be given their broadest possible meanings and would include all locations, areas, and geological features within the earth that contain, may contain, or are believed to contain, hydrocarbons.

As used herein, unless specified otherwise, the terms "field," "oil field" and similar terms, are to be given their broadest possible meanings, and would include any area of land, sea floor, or water that is loosely or directly associated with a formation, and more particularly with a resource containing formation, thus, a field may have one or more exploratory and producing wells associated with it, a field may have one or more governmental body or private resource leases associated with it, and one or more field(s) may be directly associated with a resource containing formation.

As used herein, unless specified otherwise, the terms "conventional gas", "conventional oil", "conventional", "conventional production" and similar such terms are to be given their broadest possible meaning and include hydrocarbons, e.g., gas and oil, that are trapped in structures in the earth. Generally, in these conventional formations the hydrocarbons have migrated in permeable, or semi-permeable formations to a trap, or area where they are accumulated. Typically, in conventional formations a non-porous layer is above, or encompassing the area of accumulated hydrocarbons, in essence trapping the hydrocarbon accumulation. Conventional reservoirs have been historically the sources of the vast majority of hydrocarbons produced. As used herein, unless specified otherwise, the terms "unconventional gas", "unconventional oil", "unconventional", "unconventional production" and similar such terms are to be given their broadest possible meaning and includes hydrocarbons that are held in impermeable rock, and which have not migrated to traps or areas of accumulation.

As used herein, unless stated otherwise, room temperature is 25¬∞. And, standard temperature and pressure is 25 ¬∞, –0.0 and 1 atmosphere. As used herein, unless stated otherwise, generally, the term "about" is meant to encompass a variance or range of ¬±10%, the experimental or instrument error associated with obtaining the stated value, and preferably the larger of these.

As used herein, unless stated otherwise, the terms "active seismic", "active analysis", "active imaging" and similar such terms are to be given their broadest possible meaning, and would include all imaging systems that rely upon, or utilize, a source of imaging medium, and an imaging media, that is in addition to or separate from the object or target being imaged. Thus, for active seismic there is a source of seismic waves that creates the seismic waves which travel through and reflected by the target, e.g., the well bore and formation or area around the well bore, and are then detected by sensors, which provides data or information for analysis.

As used herein, unless stated otherwise, the terms "passive seismic", "passive analysis", "passive imaging" and similar such terms are to be given their broadest possible meaning, and would include all imaging systems that rely upon, or utilize, imaging medium that is coming from, or created by, the object or target being imaged. Thus, for passive seismic, such as micro-seismic, the target, e.g., fracture propagation, the fracture being created during hydraulic fracturing, provides the seismic waves that are then detected by sensors, which provides data or information for analysis.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

This Background of the Invention section is intended to introduce various aspects of the art, which may be associated with embodiments of the present inventions. Thus, the forgoing discussion in this section provides a framework for better understanding the present inventions, and is not to be viewed as, and is not, an admission of prior art.

SUMMARY

There has been a long-standing, expanding and unmet need, for efficient and economical devices, systems and methods to obtain data and information about the hydraulic fracturing of reservoirs, and in particular, obtaining such data in real-time, as the reservoir is being developed. In particular, this need has been long felt, increasing, and unmet in the exploration and production of resources, such as hydrocarbons and geothermal energy. Thus, there exists a long felt, increasing and unfulfilled need for, among other things, devices systems and methods for obtaining data, information and imaging subterranean features and objects, and including in particular, hydraulic fracturing and the production of hydrocarbons from shale to among other things, provide one or more benefits, such as improve the efficiency of reservoir development, increase the production of recourses from the reservoir, extending the useful life of wells, reducing the rate of decline in a well, and increasing the total production obtained from wells. The present inventions, among other things, solve these needs by providing the articles of manufacture, devices and processes taught, and disclosed herein.

Thus, there is provided a method of monitoring a stimulation of a plurality of wells in a hydrocarbon formation, the method comprising: a) positioning a first monitoring and perforation device in a first section of a first well; b) positioning a second monitoring and perforation device in a first section of a second well; c) providing a perforation signal to the first monitoring and perforation device, whereby the device perforates the first well, creating a perforation in the first well; d) after completing perforation step c), removing the first monitoring and perforation device, from the first well; and then positioning the first monitoring and perforation device in a first section of a third well; e) providing a perforation signal to the second monitoring and perforation device, whereby the device perforates the second well, creating a perforation in the second well; and, f) the first monitoring device, the second monitoring device, or both the first and second monitoring devices, monitoring a hydraulic fracture of the first well.

Furthermore, there is provided a system for monitoring and perforating a plurality of wells in a hydrocarbon reservoir, the system including: a means to monitor the hydraulic fracturing of a well in the plurality of wells; a means to provide a firing signal to a perforation tool; and, wherein the means to monitor the hydraulic fracturing of the well and the means for providing a firing signal to a perforation tool monitoring are contained in a common housing.

Moreover, there is provided a system for treating a plurality of adjacent wells having casing, the system including: a plurality wirelines, each having at least one optical fiber disposed therealong, the at least one optical fiber being configured as a distributed acoustic sensor, each of the wirelines having a first termination at a first end and having a second termination at a second end, the first termination being configured to couple to perforating equipment; and a plurality of fiber-optic interrogators, each being configured to couple to the second termination of one of the wirelines, each fiber-optic interrogator being configured to interrogate the at least one optical fiber for distributed acoustic sensing data.

Further, there is provided these methods and systems having one or more of the following features: wherein perforating step e) occurs prior to monitoring step f); including: after completing perforation step e), removing the second monitoring and perforation device, from the second well; and then positioning the second monitoring and perforation device in a second section of a first well; including: after completing perforation step e), removing the second monitoring and perforation device, from the second well; and then positioning the second monitoring and perforation device in a second section of a first well; including: after completing perforation step e), removing the second monitoring and perforation device, from the second well; and then positioning the second monitoring and perforation device in a second section of a first well; and, the first monitoring device, the second monitoring device, or both the first and second monitoring devices, monitoring a hydraulic fracture of the second well; wherein the perforation extends through a well casing into a formation; wherein step c) creates a plurality of perforations; wherein step e) creates a plurality of perforations; wherein the monitoring and perforation device includes explosive charges; and, wherein the monitoring and perforation device includes an optical monitoring fiber.

In addition, there is provided a method of monitoring a stimulation of a plurality of wells in a hydrocarbon formation, the method including: a) positioning a first monitoring and perforation device in a first section of a first well; b) positioning a second monitoring and perforation device in a first section of a second well; c) providing a perforation signal to the first monitoring and perforation device, whereby the device perforates the first well, creating a perforation in the first well; d) after completing perforation step c), removing the first monitoring and perforation device, from the first well; and then positioning the first monitoring and perforation device in a first section of a third well; e) providing a perforation signal to the second monitoring and perforation device, whereby the device perforates the second well, creating a perforation in the second well; and, f) the first monitoring device monitoring a hydraulic fracture of the first well.

Still further, there is provided these methods and systems having one or more of the following features: wherein the perforation extends through a well casing into a formation; wherein step c) creates a plurality of perforations; wherein step e) creates a plurality of perforations; wherein the monitoring and perforation device includes explosive charges; wherein the monitoring and perforation device includes an optical monitoring fiber; and wherein the monitoring and perforation device includes a plurality of optical monitoring fibers.

Moreover, there is provided a method of perforating and monitoring a hydraulic fracturing of a well in a hydrocarbon reservoir, the method including: a) obtaining at a surface of the well optical information from a conveyance structure in the well, wherein the optical information travels a distance greater than 700 ft; b) transmitting from the surface of the well a perforation shoot signal in the conveyance structure to a location in the well, wherein the location is at least 700 ft from the surface; and, c) wherein the steps a) and b) occur without removing the conveyance structure from the well.

Additionally, there is provided a method of perforating and monitoring a hydraulic fracturing of a well in a hydrocarbon reservoir, the method including: a) obtaining at a surface of a first well in the hydrocarbon reservoir optical information from a conveyance structure in the well: i) wherein the optical information travels a distance greater than 700 ft; ii) wherein the optical information is generated by one or more of a perforation shot, seismic wave, rock deformation, fluid flow and temperature change; iii) wherein the one or more of the perforations shot, seismic wave, rock deformation, fluid flow and temperature change occur in a second well; b) transmitting from the surface of the well a perforation shoot signal in the conveyance structure to a location in the well, wherein the location is at least 700 ft from the surface; and, c) wherein the steps a) and b) occur without removing the conveyance structure from the first well.

Still further, there is provided a method of perforating and monitoring a hydraulic fracturing of a well in a hydrocarbon reservoir, the method including: a) transmitting optical information through a conveyance structure in the well to an optical interrogator device on a surface of the well, wherein the optical information travels a distance greater than 700 ft; b) transmitting from the surface of the well a perforation shoot signal in the conveyance structure to a location in the well, wherein the location is at least 700 ft from the surface; and, c) wherein the steps a) and b) occur without removing the conveyance structure from the well.

Additionally, there is provided a method of perforating and monitoring a hydraulic fracturing of a well in a hydrocarbon reservoir, the method including: a) transmitting optical information through a conveyance structure in a first well to an optical interrogator device on a surface of a first well in the hydrocarbon reservoir: i) wherein the optical information travels a distance greater than 700 ft; ii) wherein the optical information is generated by one or more of a perforation shot, seismic wave, rock deformation, fluid flow and temperature change; iii) wherein the one or more of the perforations shot, seismic wave, rock deformation, fluid flow and temperature change occur in a second well; b) transmitting from the surface of the well a perforation shoot signal in the conveyance structure to a location in the first well, wherein the location is at least 700 ft from the surface; and, c) wherein the steps a) and b) occur without removing the conveyance structure from the first well.

Moreover, there is provided these methods and systems having one or more of the following features: wherein the optical information includes Rayleigh backscatter pulses; wherein the optical information includes backscatter pulses; wherein the optical information is generated by Raleigh effects; wherein the optical information is generated by Brillioun effects; wherein the optical information is converted into digital information and stored in a storage medium; wherein the storage medium is a ram memory in a vehicle; wherein the storage medium is a ram memory in a vehicle, wherein the vehicle also contains a portion of the conveyance structure; wherein the optical information is converted into digital information and stored in a cloud storage system; wherein the storage medium is a hard drive in a vehicle; wherein the storage medium is a hard drive in a vehicle, wherein the vehicle also contains a portion of the conveyance structure; wherein the conveyance structure includes a wire line; wherein the conveyance structure includes a coiled tube; wherein the conveyance structure includes flat pack; wherein the conveyance structure includes a greaseless wire line; wherein the conveyance structure includes a optical monitoring fiber and an electric line; wherein the conveyance structure includes a support line, an electrical line, and an optical monitoring fiber, wherein one or both of the electrical line, and the optical monitoring fiber are contained within the support line; wherein the conveyance structure includes a support line, an electrical line, and an optical monitoring fiber, wherein one or both of the electrical line, and the monitoring optical fiber are not contained within the support line; wherein steps a) occurs both during and after step b); and, wherein steps a) occurs after step b).

A method of monitoring a hydraulic fracturing of a plurality of wells in a hydrocarbon reservoir, the method including: during a first time period, generating in a downhole optical monitoring fiber optical information about the hydraulic fracturing of a well; during a second time period simultaneously generating in a downhole optical monitoring fiber optical information about the hydraulic fracturing of two wells; and, during a third time period generating in two optical monitoring fibers optical information about the hydraulic fracturing of a single well.

Furthermore, there is provided these methods and systems having one or more of the following features: wherein steps a) to c) are repeated a plurality of times; wherein the plurality of wells includes from 6 to 12 wells, and wherein the steps a) to c) are repeated until the plurality of wells; and, wherein the plurality of wells includes from 6 to 12 wells, and wherein the steps a) to c) are repeated until at least 1,000 feet of lateral sections of each of the plurality of the wells is hydraulically fractured.

Yet, further there is provided a method of monitoring and hydraulically fracturing and a plurality of wells in a hydrocarbon reservoir, the method including: a) obtaining a field development plan including a well fracture plan for the hydraulic fracturing of a plurality of wells in the reservoir; b) the well fracture plan having a critical path; c) advancing into a well in the plurality of wells a monitoring and perforation tool assembly, including a conveyance structure having a perforation tool at its distal end, an optical monitoring fiber in optical communication with an optical interrogation device, and a fire control line, in control communication with the perforation tool and a fire control system for firing a perforation charge in the perforation tool; d) sending a fire control signal down the fire control line, whereby the perforation charges are detonated, thereby perforating the well; e) the optical monitoring fiber monitoring the hydraulic fracturing of an adjacent well; f) repeating steps c) to e) until the well fracture plan is completed; and, g) whereby optical information for 100% of the fracture plan is obtained without increasing the critical path, and without the use of a static monitoring well.

Additionally, there is provided a method of monitoring hydraulic fracturing of a well in a reservoir, the method including: a) advancing into a well in the plurality of wells a monitoring and perforation tool assembly, including a conveyance structure having a perforation tool at its distal end, an optical monitoring fiber in optical communication with an optical interrogation device, and a fire control line, in control communication with the perforation tool and a fire control system for firing a perforation charge in the perforation tool; b) sending a fire control signal down the fire control line, whereby the perforation charges are detonated, thereby perforating the well; c) the optical monitoring fiber monitoring the hydraulic fracturing of an adjacent well; and, d) removing the monitoring and perforating tool assembly from the well prior to obtaining all of the information about the hydraulic fracturing of the adjacent well.

Additionally, there is provided these methods and systems having one or more of the following features: wherein the removal of the monitoring and perforating tool assembly from the well is based upon a pumping time for the hydraulic fracture of the adjacent well; wherein the removal of the monitoring and perforating tool assembly from the well is based upon a predetermined end pumping time for the hydraulic fracture of the adjacent well; wherein the removal of the monitoring and perforating tool assembly from the well is based upon a pumping time for the hydraulic fracture of the adjacent well and a trip out time for removing the tool from the well; wherein the removal of the monitoring and perforating tool assembly from the well is based upon a predetermined end pumping time for the hydraulic fracture of the adjacent well and a trip out time for removing the tool from the well; wherein the removal of the monitoring and perforating tool assembly from the well is based solely upon a pumping time for the hydraulic fracture of the adjacent well and a trip out time for removing the tool from the well; and, wherein the removal of the monitoring and perforating tool assembly from the well is based solely upon a predetermined end pumping time for the hydraulic fracture of the adjacent well and a trip out time for removing the tool from the well.

In addition, there is provided a method of hydraulically fracturing a pair of wells in a hydrocarbon reservoir, the method including: a) advancing into a first well a first monitoring and perforation tool assembly, including a conveyance structure having a perforation tool at its distal end, an optical monitoring fiber in optical communication with an optical interrogation device, and a fire control line, in control communication with the perforation tool and a fire control system for firing a perforation charge in the perforation tool; b) advancing into a second well a first monitoring and perforation tool assembly, including a conveyance structure having a perforation tool at its distal end, an optical monitoring fiber in optical communication with an optical interrogation device, and a fire control line, in control communication with the perforation tool; c) in an alternating manner between the wells: i) perforating the well; ii) advance the tool down the well; iii) hydraulically fracture the well; while monitoring the fracture from the other well; iv) advancing the tool up the well to a non-perforated section of the well.

Moreover, there is provided these methods and systems having one or more of the following features: wherein the tool has a packer adjacent to its distal end (i.e., downhole end); wherein the tool has a packer adjacent to its proximal end (i.e., up hole end); and, wherein the tool has a first packer adjacent to its proximal end (i.e., up hole end) and a second packer adjacent to its distal end (i.e., downhole end).

Furthermore, there is provided these methods and systems having one or more of the following features: wherein the common housing is a shipping container; wherein the common housing is located on a chassis of a vehicle; wherein the common housing is located on a wireline truck; wherein the system contains a control system for the means to monitor, a control system for the means to provide a signal and a common controller for both means; wherein the common controller is a control system for a reel; wherein the common controller is a control system for a reel, the reel including an optical monitoring fiber and fire control line; including a perforation tool; including a monitoring and perforation tool assembly, including a conveyance structure having a perforation tool at its distal end, an optical monitoring fiber in optical communication with an optical interrogation device, and a fire control line, in control communication with the perforation tool; including a hydraulic fracturing pump truck and pumping a hydraulic fracturing fluid (with or without proppant) into a well; including a plurality of perforating guns, each being configured to couple to the first termination of the wirelines and being configured to perforate the casing of the wells; including a plurality of plugs, each being configured to set in the casing of the wells; wherein each of the wirelines includes a communication line; and wherein the system further includes a plurality of control units, each being configured to control the perforating gun on the wireline via the communication line; and, including pumping equipment being configured to pump fracture treatment in at least one of the adjacent wells.

Yet further, there is provided a system for treating a plurality of adjacent wells having casing, the system including: a wireline having at least one optical fiber disposed therealong, the at least one optical fiber being configured as a distributed acoustic sensor, the wirelines having a first termination at a first end and having a second termination at a second end, the first termination being configured to couple to perforating equipment; and a fiber-optic interrogator being configured to couple to the second termination of the wireline, the fiber optic interrogator being configured to interrogate the at least one optical fiber for distributed acoustic sensing data.

Moreover, there is provided these methods and systems having one or more of the following features: including a perforating gun being configured to couple to the first termination and being configured to perforate the casing of the adjacent wells; including a plurality of plugs, each being configured to set in the casing of the wells; wherein the wireline includes a communication line; and wherein the system further includes a control unit being configured to control the perforating gun on the wireline via the communication line; and, including pumping equipment being configured to pump fracture treatment in at least one of the adjacent wells.

In addition, there is provided a method of treating a plurality of adjacent wells having casing, the method including: deploying perforating equipment in the adjacent wells using a wireline having at least one optical fiber; perforating stages of the adjacent wells using the perforating equipment; stimulating the stages of the adjacent wells with fracture operations while maintaining the wireline in at least one of the adjacent wells and interrogating the at least one optical fiber in the wireline in the at least one adjacent well for distributed acoustic sensing data during the fracture operations; and repeating the steps of deploying, perforating, stimulating, and interrogating subsequent ones of the stages in a zip pattern between the adjacent wells.

Further, there is provided a method of treating a plurality of adjacent wells having casing, the method including: deploying perforating equipment in a second of the adjacent wells using a wireline having at least one optical fiber; perforating a second stage of the second adjacent well using the perforating equipment; stimulating a first stage of a first of the wells with a first fracture operation while maintaining the wireline in the second adjacent well and interrogating the at least one optical fiber in the wireline for distributed acoustic sensing data during the first fracture operation of the first adjacent well; deploying the perforating equipment in the first adjacent well using the wireline having the at least one optical fiber; perforating a third stage of the first adjacent well using the perforating equipment; and stimulating the second stage of the second adjacent well with a second fracture operation while maintaining the wireline in the first adjacent well and interrogating the at least one optical fiber in the wireline for distributed acoustic sensing data during the second fracture operation of the second adjacent well.

Moreover, there is provided these methods and systems having one or more of the following features: including repeating the steps of deploying, perforating, stimulating, and interrogating subsequent stages in a zip pattern between the first and second adjacent wells; and, including repeating the steps of deploying, perforating, stimulating, and interrogating subsequent stages in a zip pattern between the first and second adjacent wells.

Additionally, there is provided a method for treating a plurality of adjacent wells having casing, the method including: deploying perforating equipment in a first of the adjacent wells using a wireline having at least one optical fiber;

perforating a first stage of the first adjacent well using the perforating equipment; stimulating a second stage of a second of the adjacent wells with a first fracture operation while maintaining the wireline in the first adjacent well and interrogating the at least one optical fiber in the wirelines for distributed acoustic sensing data during the first fracture operation of the second adjacent well; deploying the perforating equipment in the second adjacent well using the wireline having the at least one optical fiber; perforating a third stage of the second adjacent well using the perforating equipment; and stimulating the first stage of the first adjacent well with a second fracture operation while maintaining the wireline in the second adjacent well and interrogating the at least one optical fiber in the wirelines for distributed acoustic sensing data during the second fracture operation of the first adjacent well.

Still further, there is provided a method for treating a plurality of adjacent wells having casing, the method including: deploying first and second perforating equipment in first and second of the adjacent wells using first and second wirelines each having at least one optical fiber; perforating first stages of the first and second adjacent wells using the first and second perforating equipment; retrieving the first perforating equipment with the first wireline from the first adjacent well, deploying the first perforating equipment in a third of the adjacent wells using the first wireline, and perforating a first stage of the third adjacent well using the first perforating equipment; stimulating the first stage of the first adjacent well with a first fracture operation while maintaining the second wireline in the second adjacent well and interrogating the at least one optical fiber in the second wireline for distributed acoustic sensing during the first fracture operation of the first adjacent well; retrieving the second perforating equipment with the second wireline from the second adjacent well, deploying the second perforating equipment in the third adjacent well using the second wireline, and perforating a second stage of the third adjacent well using the second perforating equipment; and stimulating the first stage of the second well with a second fracture operation while maintaining the second wireline in the third adjacent well and interrogating the at least one optical fiber in the second wireline for distributed acoustic sensing during the second fracture operation of the second adjacent well.

In addition, there is provided these methods and systems having one or more of the following features: including repeating the steps of deploying, perforating, retrieving, stimulating, and interrogating subsequent stages in a zip pattern between the adjacent wells; including determining, from the distributed acoustic sensing data, an intensity of cross-well strain between the adjacent wells in the stages; including characterizing fractures produced in the adjacent wells using the determined intensity of the cross-well strain.

DESCRIPTION OF THE PREFERRED EMBODIMENTS

In general, embodiments of the present inventions related to perforation tool monitoring systems; and methods of using those systems to develop natural resources. These perforation tool monitoring systems generally have a perforation tool, for perforating boreholes, and a fiber optics monitoring system, for monitoring activities in a formation, such as hydraulic fracturing of a well. In general, preferred embodiments of these systems have a perforation tool, a conveyance structure, the fiber optic monitoring fiber (preferably contained in the conveyance structure), and a control and monitoring systems for performing the perforation operations and the monitoring operations.

Embodiments of the present inventions generally relate to systems, methods and devices for perforating wells, hydraulic fracturing of formations and monitoring and conducting such activities, including monitoring and controlling such activities, generally, and preferably in real-time, including real-time during fracturing operations. In a particular embodiment, the systems and methods generally relate to a fiber optic wireline monitoring and perforating system. The system has a fiber optic wireline and has plug and perforating equipment and combines plug and perforation operations with distributed acoustic sensing.

Generally, embodiments of the present invention relate to monitoring hydraulic fractures in real-time during fracturing operations using a fiber optic wireline monitoring and perforating system. These embodiments have a fiber optic wireline and have plug and perforating equipment and combines plug and perforation operations with distributed acoustic sensing.

Thus, and in general, embodiments of these perforation tool monitoring systems provide the ability to perforate a well, while at the same time prior to the perforation and after the perforation, use the optical fiber of the fiber optics monitoring system to monitor activities in the formation around the well that was perforated. In this manner the activities of perforating the well and monitoring other activities in the formation, e.g., the perforation, fracturing or both of one or more wells in the formation, can occur with only a single trip downhole. Thus, in embodiments of the present methods that are made possible by using these perforation tool monitoring systems more data and information, and higher quality, e.g., resolution, accuracy, data and information can be obtained without increasing the critical path of developing the field, and without increasing capital expense, than could be achieved with prior monitoring systems and techniques.

Figure 12:
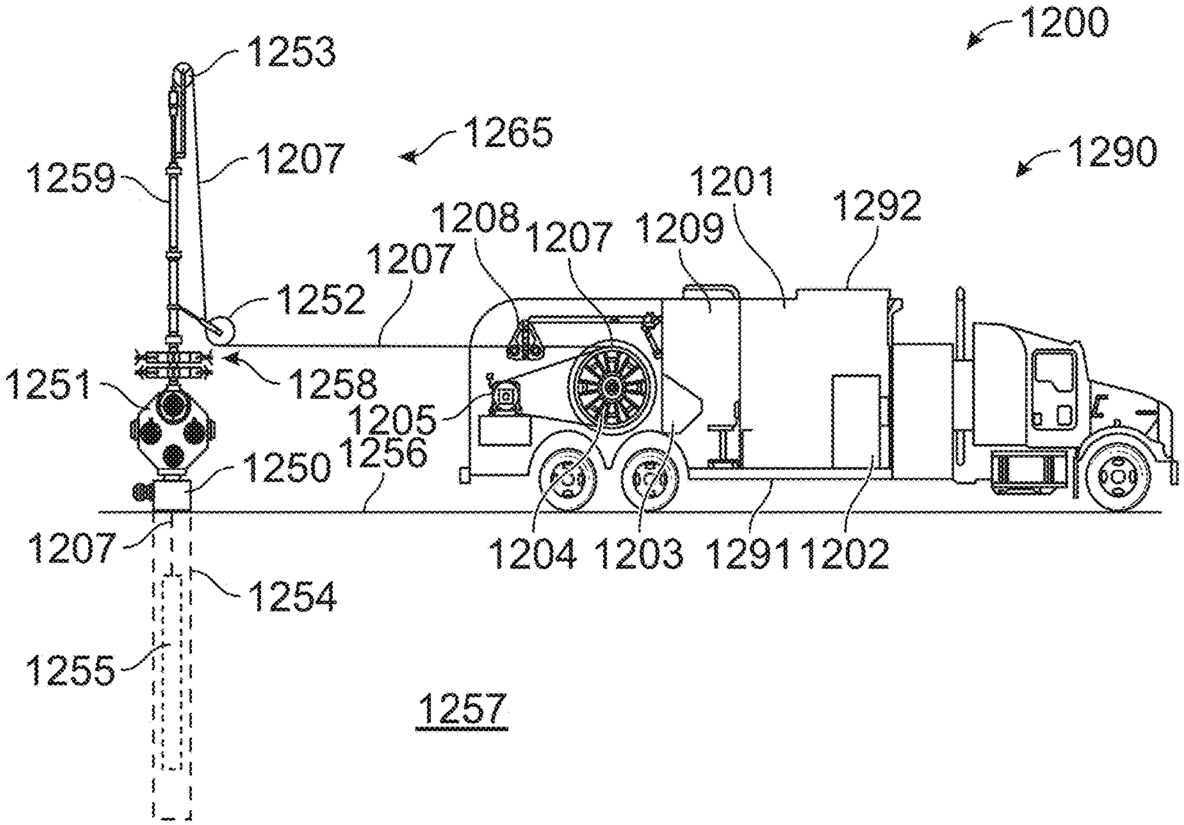
FIG. 12 is a perspective view of an embodiment of a fiber optic wireline monitoring and perforating system in accordance with the present inventions.

In general, an embodiment of a perforating tool monitoring system and its deployment and use in the field are shown in FIG. 12. Thus, the perforating tool monitoring system 1200 is on a platform, in this embodiment a mobile conveyance truck 1290, having a chassis, a bed 1291 upon which the system is mounted, and a housing 1292 that contains the system. It being understood that the perforating tool monitoring system could be mounted on, or in, any suitable platform, and preferably a mobile platform, such a barge, a railcar, a skid, a shipping container, a service boat, a pump boat, as well as, being divided between one or more platforms for shipping, which can then be configured together for use in the field.

The perforating tool monitoring system 1200 has a monitoring section 1201 and conveyance and perforating section 1209. In this embodiment the monitoring section 1201 and the conveyance and perforating section 1209 are shown as separate cabins, in being understood that these sections can be in a single cabin, or can be in a partially divided cabin. The monitoring section 1201 has monitoring equipment 1202, such as an interferometer, and may also have, equipment such as computers, processors, data storage devices (such as hard drives), and communication equipment for transmitting the data and information (e.g. images, downhole fracturing images) obtained from the optical fiber, as well as, for receiving information about the activities occurring at the field, e.g., pumping information during a hydraulic fracturing operation. In an embodiment the system has a link to the cloud for data storage, as well as, additional data, e.g., image, processing.

The conveyance and perforating section 1209 contains a spool 1204 (e.g., about 6 ft OD, barrel or axle OD of about 3 feet, and a width of about 6 feet) holding, for example, about 10,000 feet of the conveyance structure 1207 (large and smaller sizes and lengths are contemplated). The spool 1204 has a motor drive assembly 1205 that rotates the spool. The conveyance and perforating section has a control system 1203, that can be contained in a control panel as shown in the figure. The control system 1203 operates the spool and thus determines the position and location of both the monitoring system, e.g., the optical fiber, and the perforating system, e.g., the perforation tool, downhole. In this manner the system 1200 has a common control system for both the monitoring and perforating components of the system. The control systems 1203 also has the perforation activation system. This system activated the perforation tool, causing it to perforate the borehole, e.g., forming an opening through the borehole casing, cement and into the formation.

It being understood, that one or more of the components of the system 1200 can be combined or further segmented. Thus, by way of example there can be a single integrated control system, that controls all aspects of deployment, perforation and monitoring, there could be three separate control systems for these activities, and there can be one overall control system with one or more sub-systems, as well as, combinations and variations of these. The components can be located in additional separate cabins or further partitioned off, they can be partially partitioned, and they can be located in a single housing.

The system 1200 can have a rack, or support, for holding the perforation tool 1255 when not in use, and during transport or shipping. For example, the truck 1290 can have tubes or holders, e.g., in or below the bed 1291, for holding the perforation tool 1255.

As shown in FIG. 12, the system 1200 is deployed on the surface 1256 of the earth 1257, positioned near a well having a top hole assembly 1265 and a borehole 1254, which extends into the earth 1257 to a formation containing natural resources, e.g., hydrocarbons. In this embodiment the top hole assembly 1265 has a wellhead 1250, a Christmas tree 1251, a BOP 1258 and a lubricator 1259. The conveyance structure 1207 travels through winder 1208 (e.g., line guide, level wind) to a first sheave 1252, to a second sheave 1253, which can have a weight sensor associated with it. The conveyance structure 1207 having the monitoring optical fiber associated with it (e.g., contained within the conveyance structure) enters into the top of the lubricator 1259 and is advanced through the BOP 1258, tree 1251 and wellhead 1250 into the borehole 1254 and below the surface of the earth 1256. As shown in FIG. 12, the perforating tool 1255 is in the borehole 1254. It being understood, that other equipment, assemblies and configurations of the top hole assembly can be used for the deployment of the conveyance structure and perforation tool.

In general, the conveyance structure can be any type of line structure, that has sufficient strength for borehole conditions and for advancing and retrieving the perforation tool and that has an optical monitoring fiber associated with it, and that has a communication fiber, for transmitting the activation, e.g., firing, signal to the perforation tool. The conveyance structure may have other tool control and communication lines, power lines, and fluid lines, depending upon the particular systems and operations being used. Thus, a conveyance structure would include, or be based upon, by way of example, line structures such as; wireline; coiled tubing; slick line; logging cable; cable structures used for completion, workover, drilling, seismic, sensing, and logging; line structures used for subsea completion and other subsea activities; umbilicals; line structures used for scale removal, wax removal, pipe cleaning, casing cleaning, cleaning of other tubulars; cables used for ROV control power and data transmission; lines structures made from steel, wire and composite materials, such as carbon fiber, wire and mesh; line structures used for monitoring and evaluating pipeline and boreholes; and would include without limitation such structures as Power & Data Composite Coiled Tubing (PDT-CO L) and structures such as Smart Pipe® and FLATpak®. The optical monitoring fiber, can preferable be contained within the conveyance structure, but may also be associated with the conveyance structure, such as by being locate outside of that structure, affixed to the exterior of the conveyance structure.

In an embodiment the conveyance structure may be separate line structures that are deployed downhole simultaneously, such as a line attached to the perforation tool, and an optical fiber in a metal tube.

in general, the perforation tool, can be any downhole that can create perforations in a borehole that extending into the formation. Thus, for example, the perforation tool can be a perforation gun, having one, two, five or more, ten or more, twenty or more explosive charges (e.g., shaped shots) that can be fired creating the perforation, typically through casing, cement and into the formation. The perforating tool can also use high power laser to form the perforation, or high-power water jets to form the perforations, as well as, other directed energy, mechanical, and mechanical/chemical techniques to form the perforation. The perforating tool also can have associated with it, plugs, packers, and other devices that may be used, and left downhole, for isolating sections of the well for later hydraulic fracturing operations.

The perforation tool and conveyance structure can be connected by a joint or coupling, that provides for control and communication lines, as well as, power lines and fluid lines if needed, to pass through or otherwise connect to the perforation tool. Typically, the monitoring optical fiber ends at or near this joint or coupling.

The perforation tool, and the conveyance structure including the monitoring optical fiber, can be advanced into and recovered from, the borehole by, for example: (i) using fluid to pump the tool and along with it the conveyance structure downhole; (ii) using the conveyance structure to recover the tool from the well (some stiffer conveyance structures, e.g., coil tubing can also advance the tool downhole); (iii) using a downhole tractor to recover, advance or both, the tool and conveyance structure; and (iv) other techniques and devices for advancing and retrieving tools from boreholes.

In general, the monitoring fiber can be any downhole monitoring fiber, that is available for use downhole in a borehole. In a preferred embodiment the optical fiber is a fiber in a metal tube, which is then contained within the conveyance structure.

One, preferably two, or more, of the perforation tool monitoring systems, such as the type shown in the embodiment of FIG. 12, can be used in the development of a natural resource field having a formation containing a reservoir of natural resources, such as hydrocarbons or geothermal energy. Further, the embodiments of FIGS. 2A and 2B, can be used with, as a part or, or incorporated into the general embodiment of the systems of FIG. 12.

Figure 13:
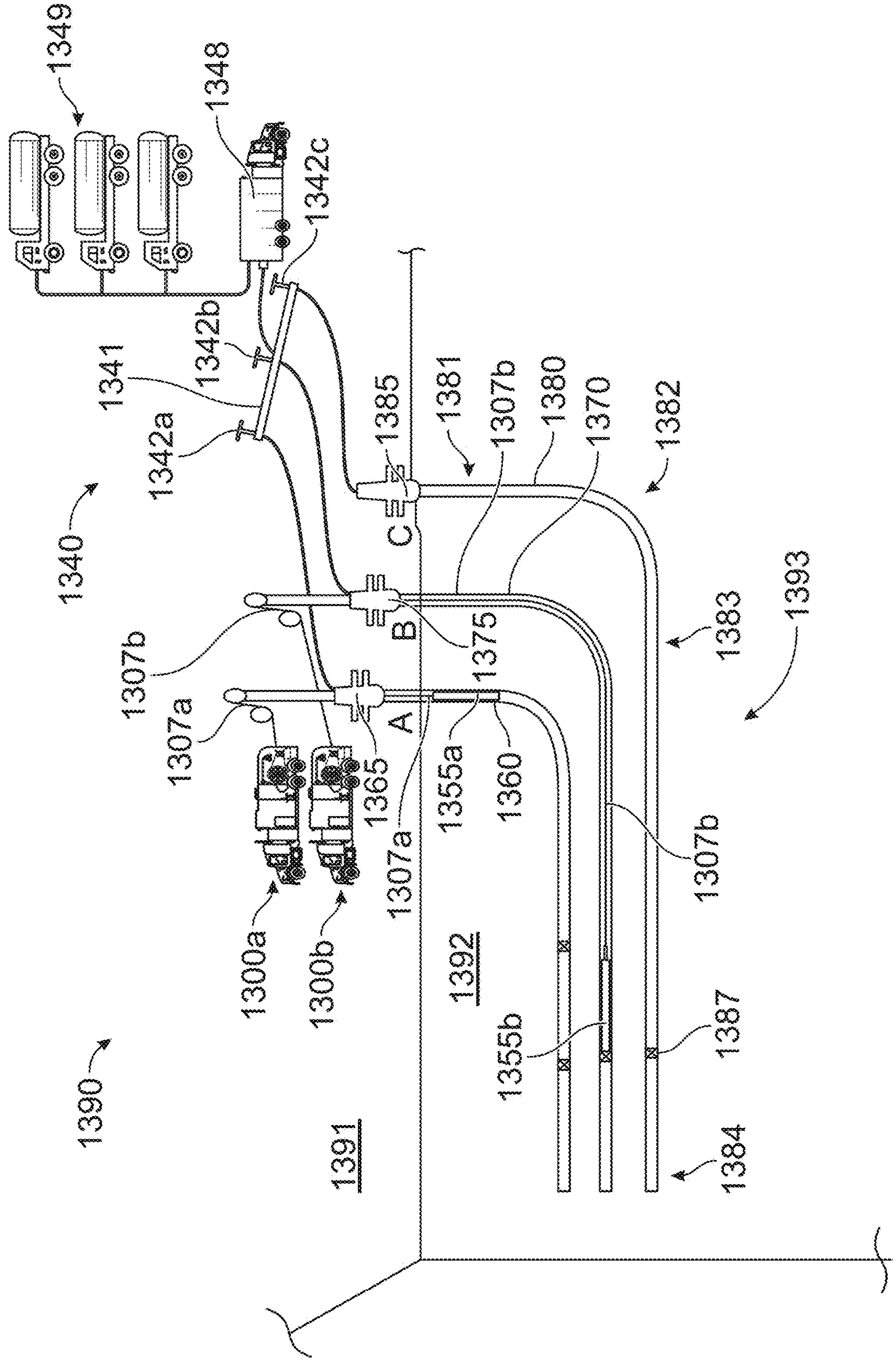
FIG. 13 is a partial cutaway perspective view of an embodiment of systems and processes for the development of a natural resource field in accordance with the present inventions.

Turning to FIG. 13 there is shown a perspective partial cutaway view of an embodiment of the systems and process for the development of a natural resource field 1390 containing natural resources such as hydrocarbons or geothermal energy. The field 1390, has a surface 1391 of the earth 1392. Below the surface 1390 is a formation containing a reservoir of natural resources 1393 (e.g., oil, gas, geothermal). For example, the formation can be a shale formation holding hydrocarbons.

In the development of the field, one, two, three or more boreholes can be, or will be, drilled into the earth and into the formation. In the embodiment of FIG. 13, three wells A, B and C are shown, with each well having a borehole 1360, 1370, 1380 extending into the earth 1392 and the formation 1393. Each borehole 1360, 1370, 1380 has a vertical section, a heel section, a lateral section and a toe section. (For the purpose of readability of the figure, only borehole 1380, has the vertical section 1381, the heel section 1382, the lateral section 1383 and the toe section 1384 numbered.) The boreholes also have plugs, e.g., 1387, located in the borehole. The plugs are used to isolate different segments, e.g., stages, of the borehole, for hydraulic fracturing. Once the hydraulic fracturing of the well is completed, the plugs can be removed, e.g., milled, drilled out. Each well A, B, C has a top hole assembly 1365, 1375, 1385.

Two perforation tool monitoring systems, 1300*a*, 1300*b*, which can be of the type generally shown in FIG. 12, are positioned near wells A and B respectively. Perforating tool monitoring system 1300*a* has its conveyance structure 1307*a* in borehole 1360 of well A, and has its perforation tool 1355*a* in the vertical section of borehole 1360. Perforating tool monitoring system 1300*b* has its conveyance structure 1307*b* in the borehole 1370 and extending deep within the lateral section of borehole 1370. System 1300*b* perforating tool 1355*b* is located deep within the lateral section of borehole 1370.

A hydraulic fracturing system 1340, having a pump truck 1348 and tankers 1349 holding fracturing fluid, is also posited near the wells, and has a manifold 1341, with values 1342*a*, 1342*b*, 1342*c*, and piping that places the fracture fluid and pump truck in fluid communication with the wells. In this manner the hydraulic fracturing system 1340 can direct the fracturing fluid to a particular, e.g., predetermined, well, at a predetermined pressure and flow rate to fracture a section of the formation that has been perforated by the perforation tool. Any system of safely and efficiently placing a particular well to be fractured in fluid communication with the pump truck and tankers can be used. As discussed below, however, to obtain full benefit of the present systems and methods, having the ability to quickly change and configure a well to receive the hydraulic fracturing fluid, i.e., to fracture the well, is preferable.

FIG. 13, is a snapshot of one part of an embodiment of a process of the present inventions. In this snapshot, system 1300*a* is tripping in or out of the borehole 1360. If system 1300*a* is tripping out, it would already have perforated the well, and monitored fracturing activities in an adjacent borehole, e.g., a borehole not shown in the figure, or well C. If system 1300*a* is tripping into the borehole 1360, it will be used to perforate the well, and also real-time monitor fracturing activities in well B and potentially well C.

In this snapshot system 1300*b* has positioned the perforation tool 1355*b* at the next location, e.g., stage, of the well and has perforated, e.g., fired the perforation gun charges. The monitoring fiber optic in conveyance structure 1307*b* is now in position for real time monitoring of the hydraulic fracturing of well C, and depending on later operations and sequencing, the hydraulic fracturing of other wells. In this snapshot of FIG. 13, valve 1342*c* is open, and valves 1342*a* and 1342*b* are closed, placing well C in direct fluid communication with the pump truck 1348, and tankers 1349. In this snapshot well C is being hydraulically fractured, and the optical fiber in conveyance structure 1307*b* is monitoring that hydraulic fracturing activity, and providing real-time data and information about the hydraulic fracturing to the monitoring system of the system 1300*b*. Thus, the perforating and monitoring system 1300*b* is obtaining real-time data and information about the hydraulic fracturing of well C.

As discussed in greater detail below, the use of the perforating tool monitoring system, which allows for both perforation and monitoring provides the ability to obtain more data and information, as well as, more reliable data and information, without increasing the critical path to develop the wells, and with little to no increase in, and preferably a reduction in the cost associated with the prior use of a dedicated monitoring wells. Thus, turning back to FIG. 13, as the three wells A, B, C are further developed and additional sections of the wells are perforated and hydraulically fractured, the two systems 1300*a*, 1300*b*, can move, alternate, between the three wells, as one section of a well is being hydraulically fractured. This ability to more and alternate the perforating tool monitoring system between the various wells, creates the additional advantage (in addition to obtaining data and information) that dead time, or ideal time, for the perforating tool is reduced or eliminated. In a preferred embodiment, ideal time for the perforating tool is reduced to only the time needed to change the valving of the manifold to transition for one well to another for hydraulically fracturing.

In addition to replacing, as well as replacing the need for, dedicated monitoring wells, e.g., permanently installed, monitoring wells, because the systems and techniques of the present inventions provide superior downhole data and information, the systems and techniques of the present inventions can be used when dedicated fiber optics and monitoring wells are not available, for any number of reasons, including cost, to perform fracture monitoring during the development of a field. Instead, the monitoring of hydraulic fractures can be provided in real-time during fracturing operations by using a fiber optic wireline and perforating equipment in a system according to embodiments of the present invention.

Figure 1:
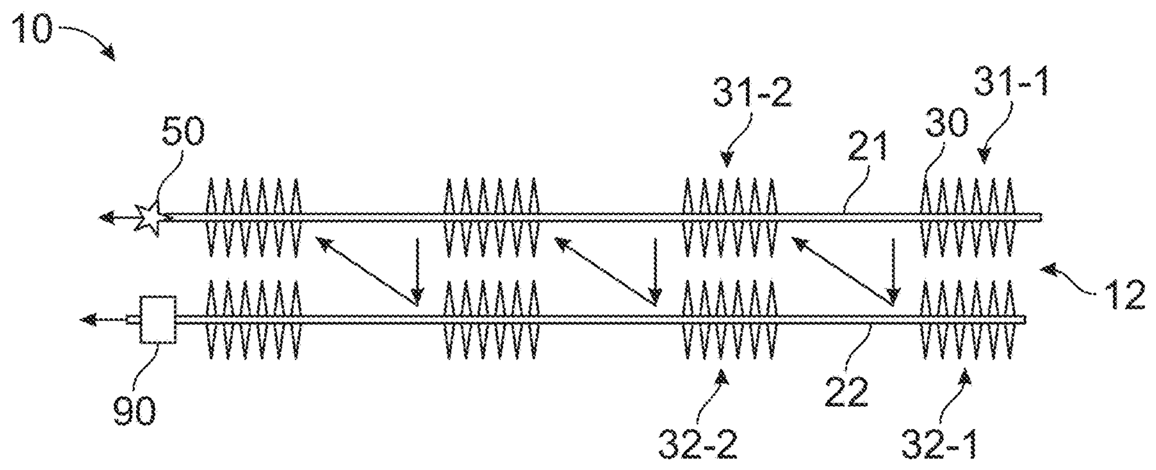
FIG. 1 is a schematic plan view of an embodiment of two adjacent wells during a perforating, monitoring and fracturing operation in accordance with the present inventions.

FIG. 1 illustrates a schematic plan view of an embodiment of a wellsite 10 having two wells 21, 22 being treated during a fracturing operation according to the present disclosure. The two wells 21, 22 are adjacent wells having lateral sections in a surrounding formation 12. The fracture operation is shown in a simplified example here for the two wells 21, 22, but the operation can be expanded to include additional wells. Pumping equipment 90, which is located on the surface of the earth near the well, is used for hydraulic fracturing, and a fiber optic wireline monitoring and perforating system 50 which is located on the surface of the earth near the well, and can be a system of the type shown in FIG. 12, is used for perforating and hydraulic fracture monitoring. This perforating tool monitoring system 50 is used instead of a traditional single conductor wireline (which does not have any monitoring capability) typically used for a perforating gun run into a well.

Figure 2A:
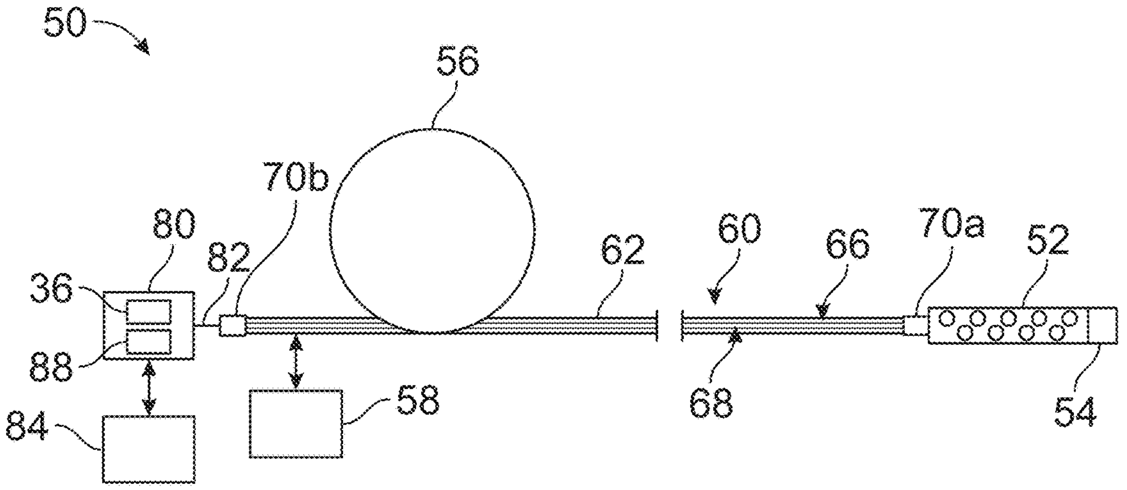
FIG. 2A illustrates a schematic view of an embodiment of a fiber optic wireline monitoring and perforating system in accordance with the present inventions.
Figure 2B:
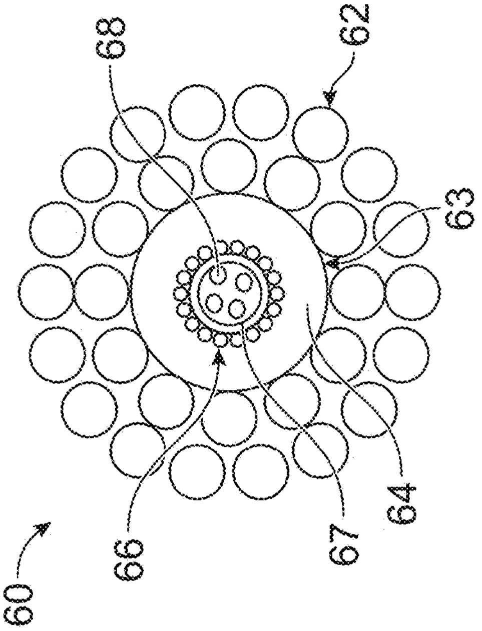
FIG. 2B illustrates an end cross-section of an embodiment of a fiber optic wireline in accordance with the present inventions.

For example, FIG. 2A illustrates a schematic view of a general embodiment of a perforating and monitoring system 50 having a conveyance structure 60 that is a fiber optic wireline, and FIG. 2B illustrates a cross-section schematic view of a general embodiment of a conveyance structure 60, which is a fiber optic wireline. The fiber optic wireline 60, is a multi-component structure, that includes an outer strength and protection component 62, e.g., an armor layer, such as a wire braiding, that surrounds, supports and protects an inner structure 63. The inner structure 63 may have a first protective layer 64 which can be any durable, flexible material suitable for downhole use, such as additional wire wrapping, Teflon® (polytetrafluoroethylene), strong flexible synthetic materials (e.g., polyethylenes, nylons, etc.), and a second (inner) protective layer 67. The inner structure 63 can have lines 66, which can be communication lines, electrical lines, fluid lines, wires, optical fibers, and other types line structures. The inner structure 63 has at least one monitoring optical fiber 68, preferably an optical fiber in a metal tube. Additional optical fibers (for monitoring, as a backup, communications, etc.) may also be included within the second (inner) protective layer 67, as shown (but not numbered) in FIG. 2B. It being understood that the components of the embodiment of FIG. 2B can be arranged in different manners, configurations, and with more or less components, provided that at least one monitoring optical fiber 68 is present. As shown in FIG. 2A, the fiber optic wireline 60 is used with plug and perforation equipment, such as a perforating gun 52 and a plug 54, that is run into the well.

Thus, turning to FIG. 2A, the embodiment of the monitoring and perforating system 50 of FIG. 2A includes components for running the plug and perforation equipment. A perforating gun 52 is run in a well on the fiber optic wireline 60 deployed from a drum 56. The perforating gun 52 has explosive charges to produce perforations in the casing so fluid communication can be made with the surrounding formation. A plug 54 can be set in the casing to isolate lower zones from fluid communication so fracture fluid can be diverted out of the perforations. Such a plug 54 can be deployed and set using appropriate setting tools on the perforating gun 52 itself. The plug 54 can be run and set in place during a separate step. A control unit 58 at the surface can communicate with the perforating equipment downhole to perform the plug and perf operation. For example, this control unit 58 can communicate with the equipment using conventional wireline communications via a communication line, such as one of lines 66, or other techniques.

The fiber optic wireline 60 includes a first termination 70*a* at a cable head and includes a second termination 70*b* at a drum side for the wireline 60. A fiber-optic interrogator 80 and a data storage device 84 are connected to the fiber optic cable 68 and are used to monitor the measurements of the fractures detected by the optical fiber 68 of the fiber optic wireline 60.

During the wireline rehead of the cable head, a fiber-optic termination 70*a* can be made by crimping the optical fiber 68 at the cable head before greasing. On the other end of the fiber optic wireline 60 at the drum side, a fiber optic termination box 70*b* can be mounted on the side of the drum 56 for making the fiber termination. A fiber-optic connection 82 (e.g., an arrangement of an optical fiber and optical connectors) from the drum side is then connected to the fiber-optic interrogator 80, which acquires distributed acoustic sensing (DAS) data during the monitoring operations.

A fiber-optic slip rings (not shown) or other optical mechanical device for providing a rotating joint between the drum and the non-rotatable components of the systems, e.g., the interrogator 80 can be used to provide a rotatable connection between the drum 56 and the interrogator 80. This rotatable connection can eliminate the need to unplug optical fiber 68 from the interrogator 80 during movement of the fiber optic wireline 60, i.e., movement of the perforating gun 52. And, then plug (re-plug) in the optical fiber 68 during monitoring and data acquisition operations. (Slip rings for other lines in the optical fiber wire line 60 can also be used.) If a rotating joint, e.g., fiber optic slip ring, is not used, the optical fiber 68 from the fiber optic termination box 70*b* can be plugged into the fiber optic interrogator 80, using connection 82, once the plug and perf sequence is performed at depth so data can be recorded during the available monitor timeframe. The fiber-optic connection 70*b* is disconnected during any significant movement of fiber optic wireline 60 when a rotating joint, e.g., fiber optic slip ring, is not used.

The fiber optic wireline monitoring and perforating system 50 uses distributed acoustic sensing (DAS) in which the optical fiber 68 of the optical fiber wireline 60 is used as a dense array of strain sensors. The fiber-optic interrogator 80 includes a laser source 86 for producing laser pulses and includes a detector 88 for detecting backscattered light from the fiber 68 returning to the interrogator 80. During the measurements, for example, the laser source 86 of the interrogator 80 repeatedly pings the optical fiber 68 of the optical fiber wireline 60 with laser pulses, the detector 88 detects the backscattered light from the fiber, and the processing equipment of the interrogator 80 measures the optical phase changes in Rayleigh backscattered light produced from the transmitted pulses.

At seismic frequencies, for example, the Rayleigh backscattering of the optical fiber 68 is sensitive to changes in dynamic strain (strain-rate) caused by the movement of the optical fiber 68. As the interrogator 80 sends the laser pulses down the fiber 68 at thousands of times a second, impurities in the fiber 68 backscatter some of the pulsed light, and the interrogator 80 records the backscattered light. A seismic wave passing through the optical fiber wireline 60 induces compression or extension in the optical fiber 68, which changes the phase of this backscattered light. The interrogator 80 uses an interferometric system to analyze the changes and converts the information into longitudinal strain-rate along the axial direction of the optical fiber 68. The measurements can then be used for seismic acquisition to achieve subsurface imaging and microseismic monitoring.

Returning to FIG. 1, horizontal sections of the two adjacent wells 21, 22 are shown in a schematic plan view passing through the formation 12. The stimulation treatments executed on unconventional wells involve multi-stage hydraulic fracturing treatments where proppant and fracture fluid are mixed and pumped from the surface down through the well casing and out into the formation through perforation stages, e.g., 31-1, 31-2, 32-1, 32-2, in the casing (as well as cement if any) of the wells 21, 22 following an operation known as "plug and perf". The perforation stages have perforation, e.g., 30, that extent through the casing, any cement, and into the formation 12.

During fracture operations, each well 21, 22 alternatingly has the monitoring and perforation equipment run downhole using the conveyance structure of the present perforating and monitoring systems, e.g., fiber optic wireline 60. One well (e.g., well 21 as shown in FIG. 1) is fractured using the pumping equipment 90, while the other well (e.g., well 22 as shown in FIG. 1) is a monitoring well, using a monitoring and perforating system (e.g., monitoring and perforating system 50) having the perforating equipment (e.g., gun 52, plug 54, etc.) on the conveyance structure (e.g., fiber optic wireline 60).

In general, the sequence of the operations is such that one well is perforated and without removing the perforation tool, that well is used to monitor the other well during hydraulic fracturing (or other operation performed on the other well). The perforation tool is then removed and run down the fractured well, and used to perforate another stage and monitor activity in the other well. In this manner there is an alternating sequence where the role of monitoring well and fractured well changes, over the course of the perforating and fracturing activities along the length of the wells. This alternating sequence of monitoring/perforating in one well, while another well is hydraulically fractured can take place for two, preferably three, four or more wells in a field.

Turing back to FIG. 1, for example the alternating sequence can follow a staggered sequence, that can be in a zipper like pattern, shown by the arrows, starting from one well 21 at a first stage 31-1. Thus, for example, the order of the alternating sequence can be:

a) the perforating and monitory system is in well 21 and stage 31-1 is preformatted b) stage 32-1 is hydraulically fractured, while being monitored from well 21 using the perforating and monitoring system in well 21 c) the perforating and monitoring system is run down well 22 and perforates stage 32-2 d) stage 31-1 is hydraulically fractured, while being monitored from well 22 using the perforating and monitoring system in well 22;

e) the perforating and monitoring system is run down well 21 and perforates stage 31-2 f) stage 32-2 is hydraulically fractured, while being monitored from well 21 using the perforating and monitoring system in well 21 g) the process continues along the length of the wells

The timeframe of such a plug and perforation sequence (the wells are typically plugged before perforation and prior to hydraulic fracturing a stage) gets shorter compared to stimulation (hydraulic fracturing) as completion of the various stages moves up the wells 21, 22. Prior to the present inventions, the wireline used to run downhole tools (e.g., perforating gun) to plug and perforate a stage of the well is pulled out of the well and is held at the surface depending on the depth of the stages being completed. This results in idle (e.g., wasted) time for the tool. Instead of pulling out of hole, the conveyance structure (e.g., fiber optic wireline 60) and down hole perforating tool (e.g., gun 52) of the present inventions can stay at depth for monitoring while the adjacent well is stimulated (e.g., hydraulically fractured). The intermittent time widows between stages are then used to monitor fractures formed during stimulation, and the information can be combined with later diagnostic information to characterize the fractures, formation, and other properties of the well in the reservoir.

In general, the present techniques integrates the plug and perforation operation with fiber optic wireline diagnostics, which builds sensors into the equipment already used to execute almost all current stimulation treatments. This allows completion engineers to map the created fractures without the need for separate dedicated measuring equipment, interruption, or risk to completion operations, among other benefits.

Microseismic is a well-established and effective technique to map hydraulic fractures. The present technique uses fiber optic wireline sensing to perform microseismic monitoring without additional equipment or operational risk beyond what is already required to stimulate the well. Microseismic surveys are typically acquired by deploying dedicated geophysical sensing equipment into the downhole environment. This requires accessing additional wells other than the well that is being stimulated, building geophysical sensing equipment into the original well construction, or deploying large numbers of sensors over the earth's surface above the well that is being stimulated. As noted, all previous methods required dedicated equipment, operations, costs, and risks beyond what is required to stimulate the well and are therefore difficult to justify on more than a few wells in the overall development program for a field. Using embodiments of the present monitoring and perforating system, however, an embodiment of the fiber optic wireline is used to deploy the perforating equipment, and the optical fiber in the wireline provides distributed acoustic sensing (DAS) data for seismic acquisition and monitoring.

During a fracture operation, for example, monitoring the fracture growth and understanding the fracture geometry during completions can be very useful for future well planning and operations. The fractures created in the formation may not behave in the way that is initially modeled or predicted. Poor fracturing operations may lead to fracture growth in a depleted zone, production losses, wellbore integrity issues, and unwanted interactions with neighboring wells or formations. Embodiments of the present optical fiber wireline monitoring and perforating systems and techniques address, mitigate and solve the problems, in a cost and time efficient manner.

For example, using the present optical fiber wireline monitoring and perforating systems and techniques, real-time fracture monitoring is achieved by using microseismic, cross-well strain, or a combination of these datasets. Microseismic generates an event cloud of the fracture geometry, while cross-well strain gives a direct measurement of the treatment well's fracture response. The microseismic measurements can be acquired using the optical fiber at higher frequencies to capture strain events. The optical fiber provides distributed temperature and acoustic sensing capabilities so temperature and strain can be continuously monitored along the wellbore. The high sensitivity of the optical fiber provides visibility of the whole wellbore to detect when fractures are growing towards the fiber. The measurement ultimately aids in the visualization of the fracture network being created during the fracture operation.

Generally, in pursuit of further operational efficiencies, a preferred practice is to complete three or more wells together using more than one wireline and using pumping equipment that is capable of pumping more than one well at a time. With two monitoring and perforating systems it is possible to coordinate operations such that at least one fiber optic wireline is available to monitor fracturing from one well while also completing the needed perforations and maintaining full utilization of pumping resources in the other wells.

The following examples are provided to illustrate various embodiments of the present perforating and monitoring system, techniques and operations, including real-m time stimulation monitoring using perforating and monitoring systems having a conveyance structure that is a fiber optic wireline. These examples are for illustrative purposes, may be prophetic, and should not be viewed as, and do not otherwise limit the scope of the present inventions.

EXAMPLES

Example 1

Figure 3:
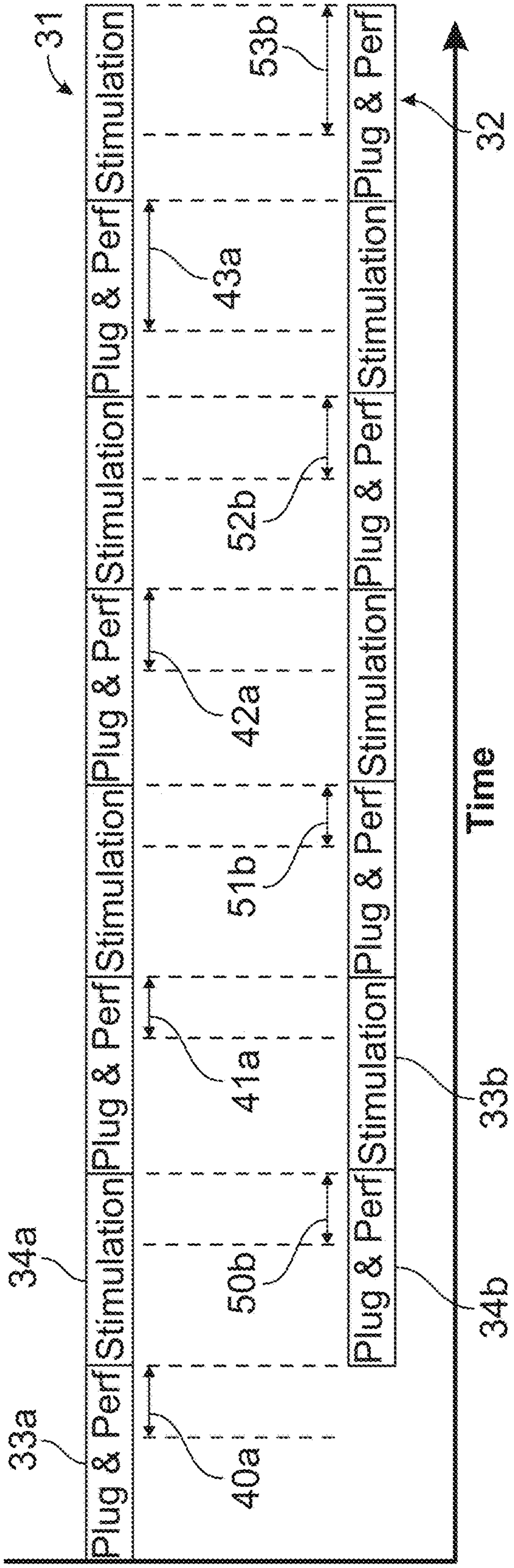
FIG. 3 is a chart showing an embodiment of the stages of a perforating, monitoring and fracturing operation over time for two adjacent wells in accordance with the present inventions.

FIG. 3 graphs a general embodiment of a sequence of a fracturing operation using the present monitoring and perforating systems. The sequence of the operation for the two wells 31, 32 is shown relative to the time of the operations. Each well 31, 32 is plugged and perforated in separate plug and pert operations, e.g., 33*a*, 33*b*, and each well 31, 32 is stimulated in an alternating pattern of stimulations, e.g., 33*a*, 33*b*. This brings efficiency to the operations as well as other benefits. The double arrows and dashed lines 40*a*, 41*a*, 42*a*, 43*a*, represent the time periods or windows when well 31, having an embodiment of the present monitoring and perforating system (e.g., FIG. 2A, FIG. 12) in well 31, is used to monitor the fractures produced during the stimulations of the adjacent well 32. The double arrows and dashed lines 50*b*, 51*b*, 52*b*, 53*b*, represent the time periods or windows when well 32, having an embodiment of the present monitoring and perforating system (e.g., FIG. 2A, FIG. 12) in well 32, is used to monitor the fractures produced during the stimulations of the adjacent well 31. Only one monitoring and perforating system is needed to perform these operations, and preferably only one system is used; however, two systems may also be used. The conveyance structure (e.g., FIG. 2B) of the monitoring and perforating system stays at depth so that the time windows between stages can be used to monitor the fractures formed during stimulation of the adjacent well. (It is noted that in the illustration of FIG. 3, situation time includes time tripping out time for the system, as well as, stimulation time.) This alternating sequence of monitoring/perforating in one well, while another well is hydraulically fractured can take place for three, four or more wells in a field.

It is noted that the time windows increase in time as the process progresses. This is because the process starts at the toe of the well (left side of graph of FIG. 3) and progress to the heel of the well. Thus, in later plug and perforation operations the tripping time is shorted, because there is less distance for the tool to travel in and out of the well, and thus more time downhole for monitoring.

In general, the present optical fiber wireline monitoring and perforating systems and techniques, reduce and eliminate the need for additional monitor wells or permanent installation of fiber optics in treatment wells to perform fracture monitoring. Instead, embodiments of the monitoring and perforating system having the fiber optic wireline (e.g., FIG. 2A and FIG. 2B, item 60) can be used during the fracturing operation of running the plug and perforation sequence. This process utilizes an existing workflow for fracturing wells and adds the ability to monitor the fractures during the downtime after a plug has been set and perforations have been shot in the well to be next stimulated. The operational setup time is meniscal compared to the months and days typically required to plan and instrument a well correctly to monitor fractures using prior systems and techniques.

Preferably, the monitoring includes the collection of microseismic data.

Example 2

Figure 4:
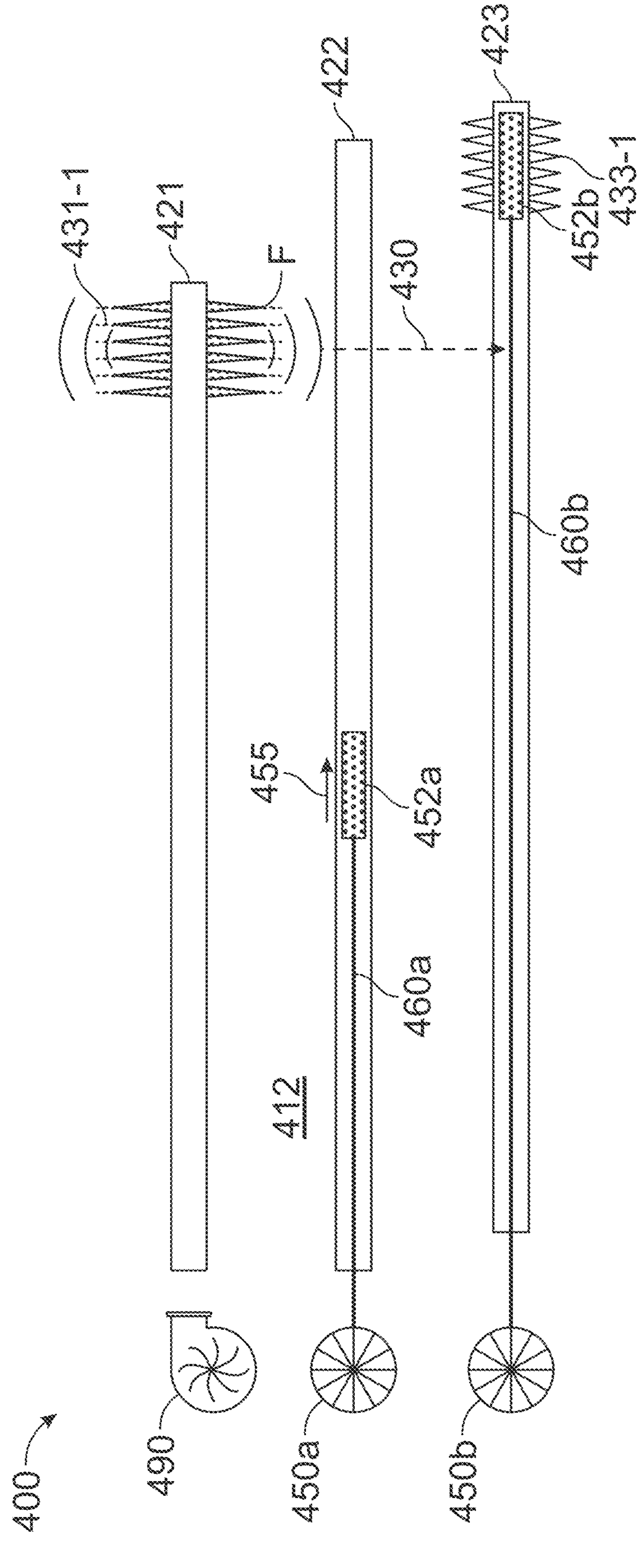
FIG. 4 is a schematic plan view of an embodiment of three adjacent wells during a perforating, monitoring and fracturing operation in accordance with the present inventions.

Turning to FIG. 4 there is shown a schematic plan view of a monitoring/perforating operation 400 for three adjacent wells 421, 422, 423, in a reservoir 412 (e.g., hydrocarbon, geothermal), using an embodiment of the present optical fiber wireline monitoring and perforating systems (e.g., FIG. 2A, FIG. 12) and techniques. The fracturing operation involves multi-stage hydraulic fracturing treatments where proppant and fracture fluid are mixed and pumped from the surface down through the well casing and out into the formation through perforations in the casing. In this embodiment two optical fiber wireline monitoring and perforating systems are used for the stimulation, and monitoring of that stimulation, of the three wells. Optical fiber wireline monitoring and perforating system 450*a*, has conveyance structure, e.g., optical fiber wireline 460*a*, and perforating and plugging tool 452*a*. Optical fiber wireline monitoring and perforating system 450*b*, has conveyance structure, e.g., optical fiber wireline 460*b* and perforating and plugging tool 452*a*.

With integrated perforation and fiber optic wireline diagnostics, the conveyance structure, e.g., optical fiber wireline 460*a*, 460*b*, are used to deploy and retrieve the perforating guns 452*a*, 452*b*, respectively, and include one or more optical fibers. The optical fibers in the optical fiber wirelines 460*a*, 460*b*, can make all of the measurements required to enable advanced fracture diagnostics without additional downhole equipment.

In the multi-well operations, the fiber optic wirelines 460*a*, 460*b*, can be left in the well before or after perforating, in a position to record the far-field response of fracturing as pumping operations continue on a neighboring well. Preferably, to maintain full utilization of the pressure pumping resources of pumping equipment 490, the fiber optic wireline is retrieved from the well in time so that the wireline can be out of the second well by the time pumping operations are complete on the first well. Thus, optical fiber wireline 460*b* and tool 452*b*, will be removed from well 423, by the time the pumping (e.g., stimulation, pumping of fracture fluid) operations on well 421 are completed.

In FIG. 4, a schematic view of a three-well stimulation operation is shown having a first monitoring and perforating system 450*a* and a second monitoring and perforating system 450*b* and pumping equipment 490 (e.g., of the type shown in the embodiment of FIG. 13). The point in the operation shown in FIG. 4 is about midway through fracturing of a first stage 431-1 on a first well 421 with the pumping equipment 490. At this point, the first stage 433-1 of well third well 423 has been perforated by tool 452*b*. The second monitoring and perforating system 450*b* in the third well 423 is monitoring fractures (F) growing from the stimulation process in the first well 421, as shown by dashed arrow 430. At this point, the first system 450*a* has been moved off the first well 421 (having finishing the perforation of stage 431-1) and is currently running the perforating gun 452*a* (direction of travel is shown by arrow 455) into the second well 421 on the way to perforate the first stage of that well.

As the process progresses, (not shown in FIG. 4), once the first stage of the second well 422 is perforated by tool 452*a*, the second system 450*b* on the third well 423 will hand over monitoring duties to the first system 450*a*, which is in well 422. The second system 450*b* will recover (e.g., remove from the well, trip out) the tool 452*b* from well 423, in time for pumping the first stage 433-1 of the third well 423. The staggered sequential process continues until all of the predetermined stages for the wells have been stimulated, and the stimulations monitored.

Preferably, the monitoring includes the collection of microseismic data.

Example 3

Figure 5:
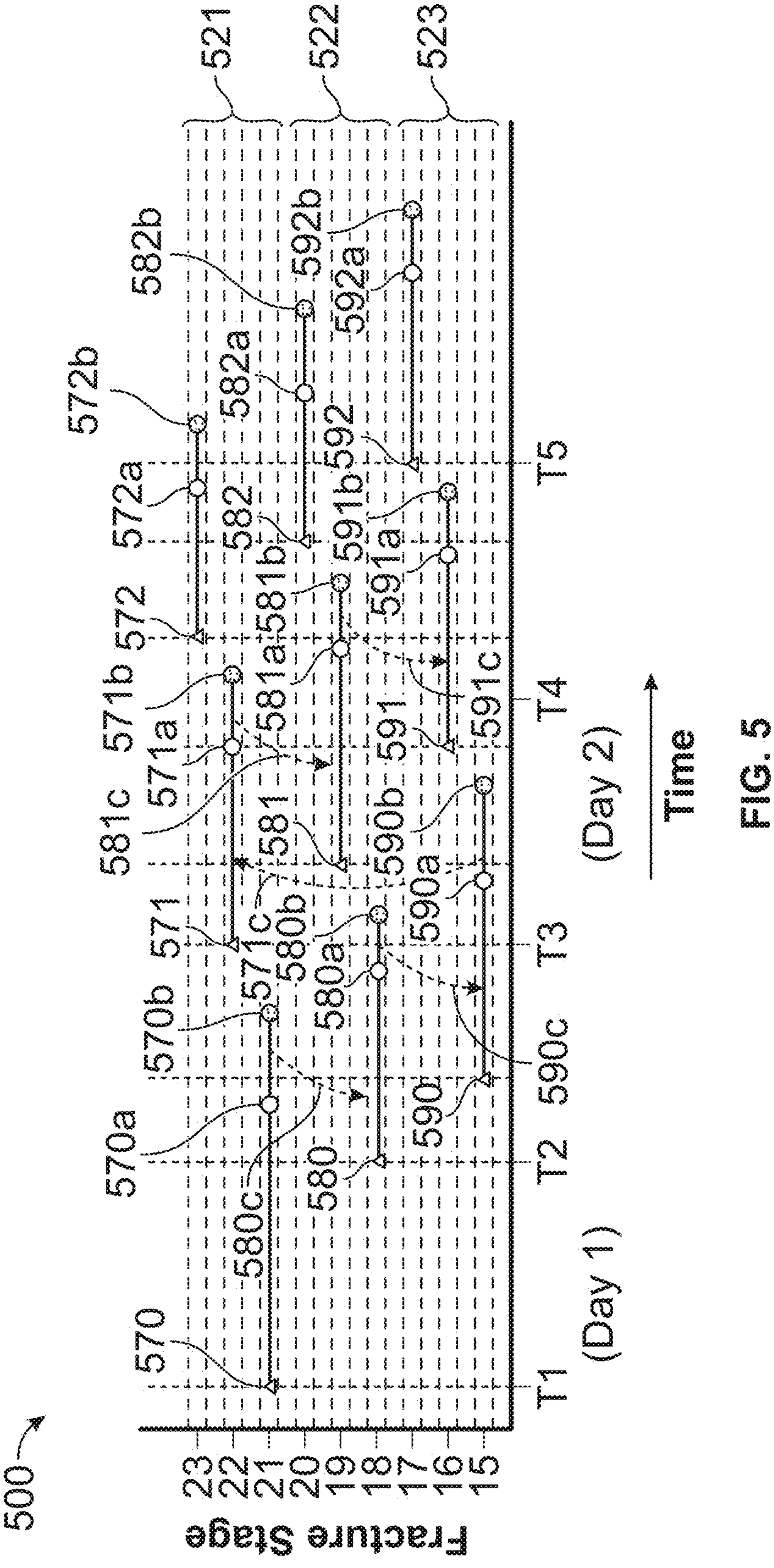
FIG. 5 is a graph of the stages of a perforating, monitoring and fracturing operation over time for three adjacent wells in accordance with the present inventions.

Turing now to FIG. 5, which shown a graph 500 of an embodiment of the timing of the plug and perforation and monitoring operations for stages of an embodiment of the present operations over time for three adjacent wells. Fracture stages of three wells 521, 522, 523 are shown in a stepped fashion (e.g., staggered sequence). The stages are numbered with the lower numbers being closest to the toe of the well and the larger numbers being closer to the heal of the well. The time is shown in hours represented by T1 etc., and days. Further FIG. 5 is a view of a specific time period, which is only a part of the overall operation.

The present monitoring and perforating systems (e.g., FIG. 2A, 2B, FIG. 12) can perform the operation of FIG. 5.

Thus, there is shown for stage 21 of well 521 the completion 570 of the perforations, the starting 570*a* and the stopping 570*b* of the stimulation. There is shown for stage 22 of well 521 the completion 571 of the perforations, the starting 571*a* and the stopping 571*b* of the stimulation. There is shown for stage 23 of well 521 the completion 572 of the perforations, the starting 572*a* and the stopping 572*b* of the stimulation.

Thus, there is shown for stage 18 of well 522 the completion 580 of the perforations, the starting 580*a* and the stopping 580*b* of the stimulation. There is shown for stage

19 of well 522 the completion 581 of the perforations, the starting 581*a* and the stopping 581*b* of the stimulation. There is shown for stage 20 of well 522 the completion 582 of the perforations, the starting 582*a* and the stopping 582*b* of the stimulation.

Thus, there is shown for stage 15 well 523 the completion 590 of the perforations, the starting 590*a* and the stopping 590*b* of the stimulation. There is shown for stage 16 of well 523 the completion 591 of the perforations, the starting 591*a* and the stopping 591*b* of the stimulation. There is shown for stage 17 of well 523 the completion 592 of the perforations, the starting 592*a* and the stopping 592*b* of the stimulation.

Further, the de minimis time between the stopping of the stimulation in one stage (e.g., 570*b*) and the starting of the next in time stimulation (e.g., 589*a*) is attributed to the time to change the flow path of the fracturing fluid from one well (e.g., 521) to the next well (e.g., 522). This change from one well to the next can be accomplished through the use of a valved manifold.

In the example of FIG. 5, a first sequence, conducted by a first monitoring and perforating system, perforates stage 21 of the first well 521. Before the stimulation start 570*a*, a second sequence conducted by a second monitoring and perforating system perforates 580 stage 18 of the second well 522, which is adjacent to the first well 521.

The stimulation 570*a*-570*b* of the first well 521, takes place while the second monitoring and perforating system is in the second well 522 and monitors that fracturing 570*a*-570*b*, during a monitoring phase of the second sequence, as shown by dashed arrow 580*c*.

A third sequence, conducted by the first system (the first system having been pulled out of the second well 521 prior to the start 570*a* of stimulation) performs a perforation 590 at stage 15 of the third well 523, which is adjacent to second well 522 and not adjacent to first well 521. The first system in well 523 monitors the stimulation 580*a*-580*b* of well 522, during a monitoring phase of the third sequence, as shown by dashed arrow 590*c*.

A fourth sequence, conducted by the second system (the second system having been pulled out of the second well 522 prior to the start 580*a* of stimulation), performs a perforation 571 at stage 22 of the first well 521. The second system in well 521 monitors the stimulation 590*a*-590*b* of the third well 523, during a monitoring phase of the fourth sequence, as shown by dashed arrow 571*c*.

A fifth sequence, conducted by the first system, (the first system having been pulled out of the third well 523 prior to the start 590*a* of stimulation) performs a perforation 581 at stage 19 of the second well 522. The first system in well 522 monitors the stimulation 571*a*-571*b* of the first well 521, during a monitoring phase of the fifth sequence, as shown by dashed arrow 581*c*.

A sixth sequence, conducted by the second system, (the second system having been pulled out of the first well 521 prior to the start 571*a* of stimulation), performs a perforation 591 at stage 16 of the third well 523. The second system in well 523 monitors the stimulation 581*a*-581*b* of second well 522, during a monitoring phase of the sixth sequence, as shown by dashed arrow 591*c*.

This process continues until the predetermined stages of wells 521, 522, 523 have been perforated, fractured and monitored. It further being understood that this process can be repeated on an additional three well, until the entire number of predetermined wells in the field have been perforated, fractured and monitored.

Preferably, the monitoring includes the collection of microseismic data.

Example 4

Figure 6:
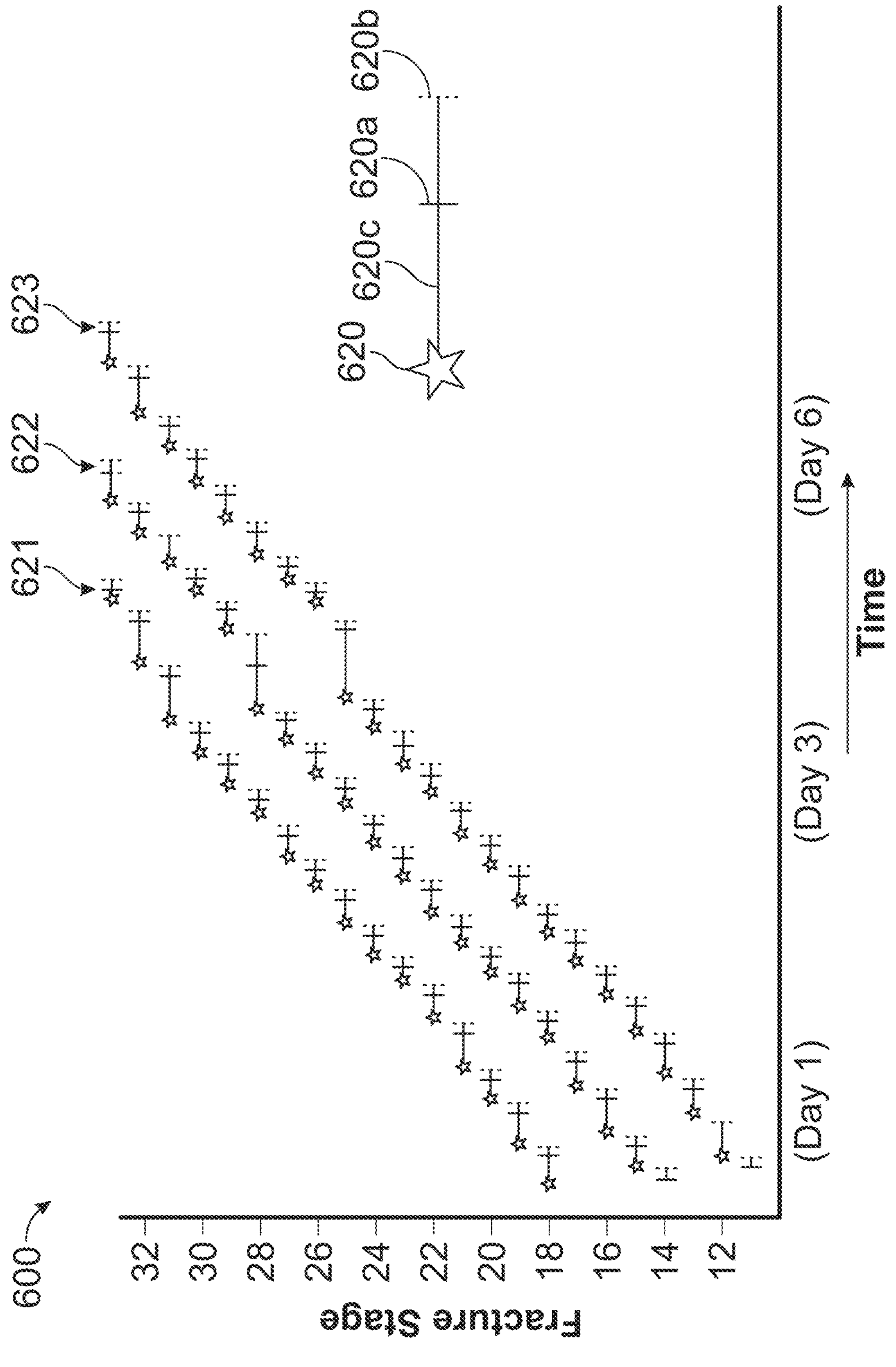
FIG. 6 is a graph of an embodiment of the operational timing of a perforating, monitoring and fracturing operation over time for three adjacent wells in accordance with the present inventions.

Turning to FIG. 6 there is shown a graph of an embodiment of an operational timing of the perforating, monitoring and fracturing operation for three wells 621, 622, 623, over several days using one pump truck and two monitoring and perforation systems, such as in a configuration of the type shown in FIG. 13. The enlarge key for the figure shows the activities represented in each stage. Thus, there is a completion, star 620 of the perforations, a monitoring phase 620*c*, a start, line 629*a* and a stop (grey) line 620*b* of the stimulation.

For well 621 stages 18 to 33 are completed in the operation. For well 622 stages 14 (partially shown) to 33 are completed in the operation. For well 623 stages 11 (partially shown) to 33 are completed in the operation. It being understood that the operation shown in FIG. 6 is only a part of the total operation for perforating monitoring and stimulation the wells. The present monitoring and perforating systems (e.g., FIG. 2A, 2B, FIG. 12) can perform the operation of FIG. 6.

The operation of FIG. 6 can be performed in the manner of Example 3.

Example 5

Figure 7A:
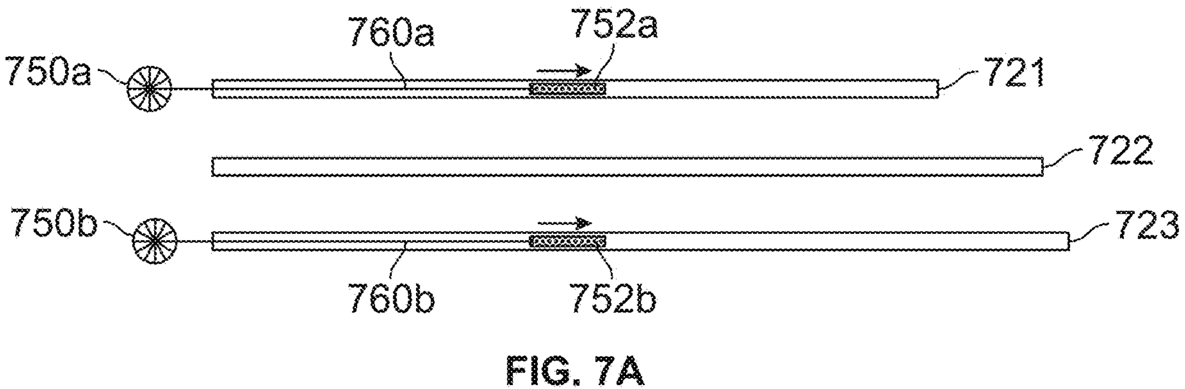
FIGS. 7A-7C, 8A-8B, 9A-9B and 10A-10B are schematic plan views showing the sequence of activities for three adjacent wells during an embodiment of a perforating, monitoring and fracturing operation in accordance with the present inventions.

Turning to FIGS. 7A-7B, 8A-8B, 9A-9B, and 10A-10B there are shown a schematic plan view of an embodiment of a series of operations for perforation, monitor and stimulation technique. FIG. 7A being the first in time in the series of operations, and they proceed sequentially until FIG. 10B, which is the last. The operations of this example can be carried out by the present monitoring and perforating systems and configurations (e.g., FIG. 2A, 2B, FIG. 12, FIG. 13 (with or without the manifold)).

These Figures show schematic views of three adjacent wells 721, 722, 723 during sequences of the operation. As discussed, the fracturing operation uses a parallel configuration in which wireline operations are conducted on one or more wells while fracture pumping continues on another well.

Figure 7B:
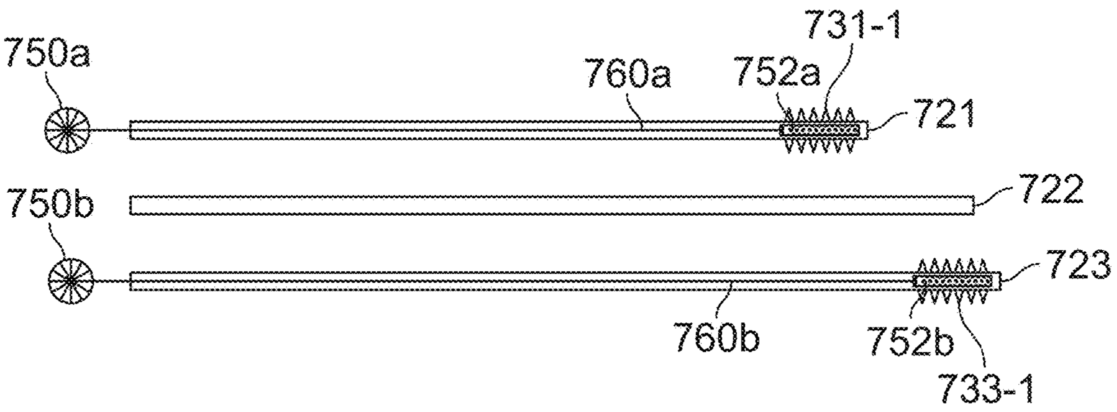
Figure 7C:
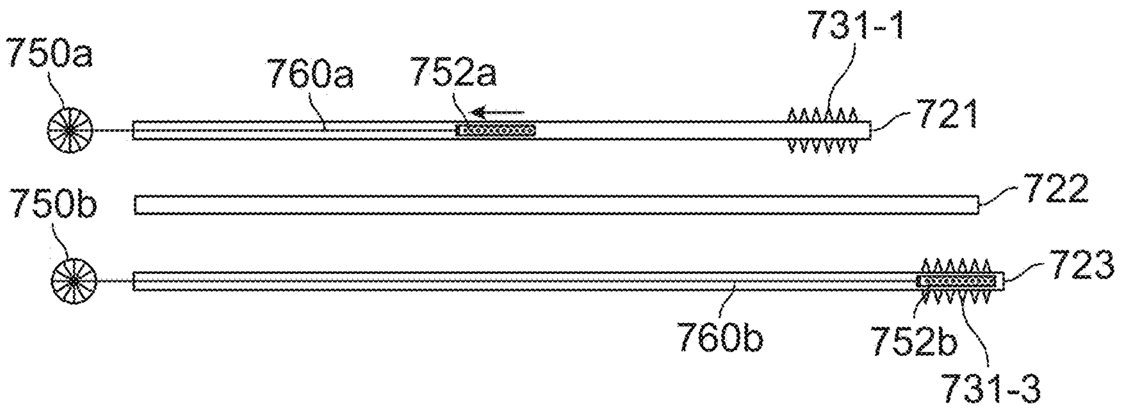

First, as shown in FIG. 7A, perforating gun 752*a* attached to fiber-optic wirelines 760*a* of the monitoring and perforating system 750*a* is deployed into well 721, and forced to the end of the lateral section of well 721, by pumping fluid into the well 721 behind the perforating gun 752*a*. At the same time perforating gun 752*b* attached to fiber-optic wirelines 760*b* of the monitoring and perforating system 750*b* is deployed into well 723, and forced to the end of the lateral section of well 723, by pumping fluid into the well 723 behind the perforating gun 752*b*. Next, as shown in FIG. 7B, the perforating guns 752*a*, 7552*b* are fired and leave first stages 721-1, 723-1 of perforations in the casings of the wells 721, 723. Next, as shown in FIG. 7C, the perforating gun 752*a* for well 721 is immediately retrieved from the well 721 via the attached wireline 760*a*. The perforating gun 752*a* for the other well 723 remains in place in well 723 for monitoring other wells.

Figure 8A:
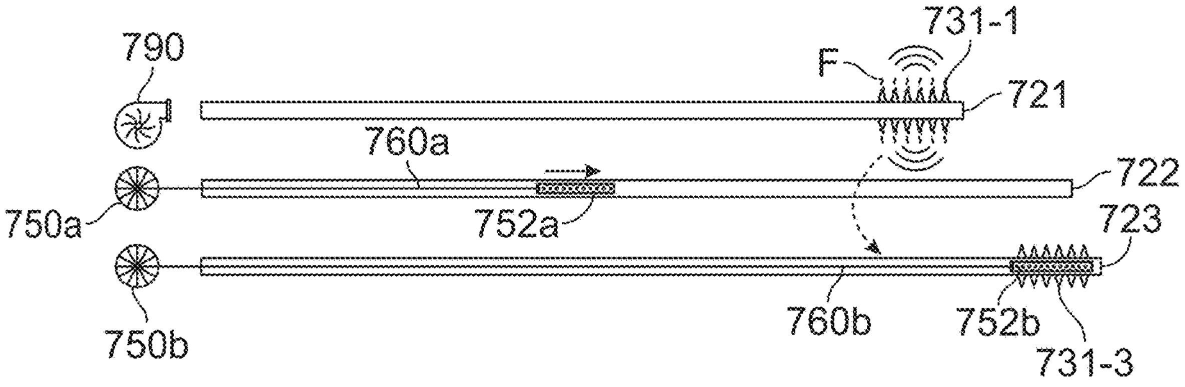

Next, the stimulation and monitoring operations begin as shown in FIG. 8A. The hydraulic fracture pumping equipment 790 is placed in fluid communication (for example, preferably through opening a value in a manifold that is connect to all three wells) to the wellhead of the first well 721 and is used to pump the specified mixture of proppant and fracture fluid through the first stage 731-1 of perforations and out into the formation to generate fractures (F). During this fracturing, the monitoring and perforating system 752*b* in the third well 723 is monitoring well 721 and detects cross-well microseismic events from the fracturing of the first stage 731-1 in the first well 721 as shown by the dashed arrow. At the same time, the perforating gun 752*a* attached to system 759*a*'s fiber optic wireline 760*a* is pumped down to the end of the lateral section of well 722.

Figure 8B:
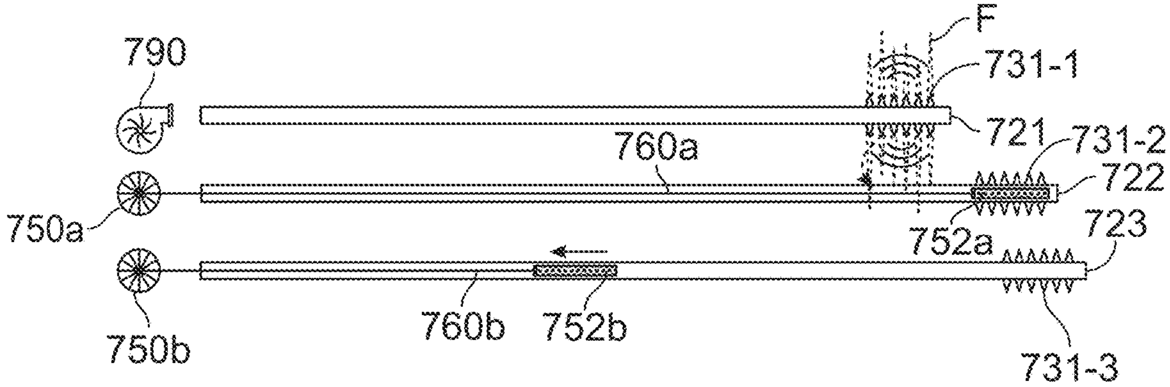

As then shown in FIG. 8B, perforation of the first stage 732-2 of well 722 is performed by gun 752*a*. Gun 752*b* is being withdrawn from well 723, and cannot be used for monitoring during its withdrawal. At the same time stage 731-1 of well 721 continues to be hydraulically fractured. Thus, the monitoring of the fracturing of stage 732-1 is conducted by system 750*a* in well 722, which detects microseismic events from the fracturing of the first stage 731-1 in well 721, as shown by the dashed arrow. The perforating gun 752 attached to fiber optic wireline 760*b* is retrieved form well 723, to prepare the well for fracturing and to prepare the gun for perforating well 721 as is shown in FIG. 9A.

Figure 9A:
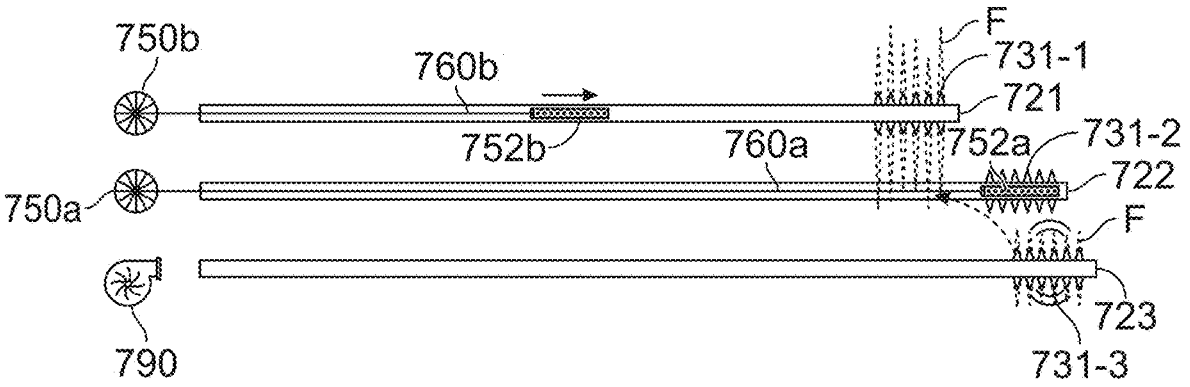

Thus, turning to FIG. 9A, once the pumping is complete on well 721 to form the fractures (F) in the first stage 731-1, the perforating gun 752*b* is pumped back down the well 721 to a point just above the previously made perforations that formed stage 731-1. The fracture pumping equipment 790 is connected to the wellhead of well 723 and is used to pump the specified mixture of proppant and fracture through the perforations and out into the formation to generate a first stage 731-3 of fractures. The system 750*a* in well 722 is used to detect microseismic events from the fracturing of the first stage 731-3 in well 723, as shown by the dashed arrow.

Figure 9B:
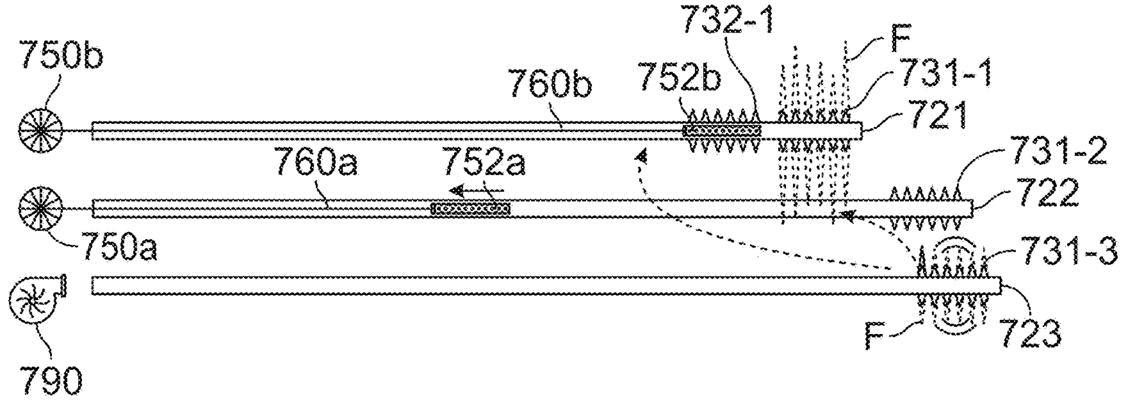

As then shown in FIG. 9B, the perforating gun 752*b* perforates stage 732-1 in well 721. The perforating gun 752*a* attached to the fiber optic wireline 760*a* of the first system 750*a* is retrieved from well 722 to prepare the well for fracturing. The second system 750*b* in the first well 721 is used to detect microseismic events from the fracturing of the first stage 733-1 in well 723, a shown by the dashed arrow.

Figure 10A:
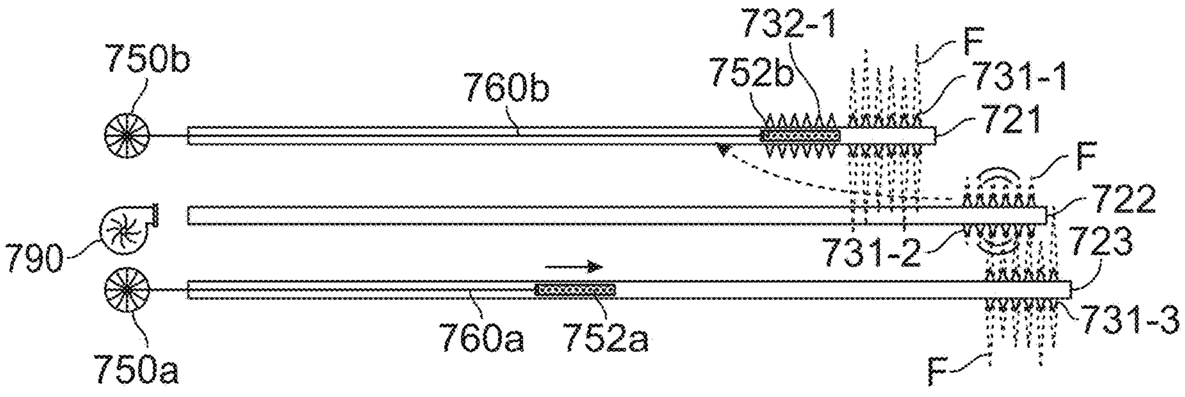

As then shown in FIG. 10A, the second stage 732-1 of 721 has been perforated. As well 722 is hydraulically fractured, the second system 750*b* in well 721 is used to detect microseismic events from the fracturing of the first stage 731-2 in well 722, as shown by the dashed arrow. The perforating gun 752*a* for well 723 is pumped back down the third well 723 to a point just above the perforations in stage 731-3, which have already been made.

Figure 10B:
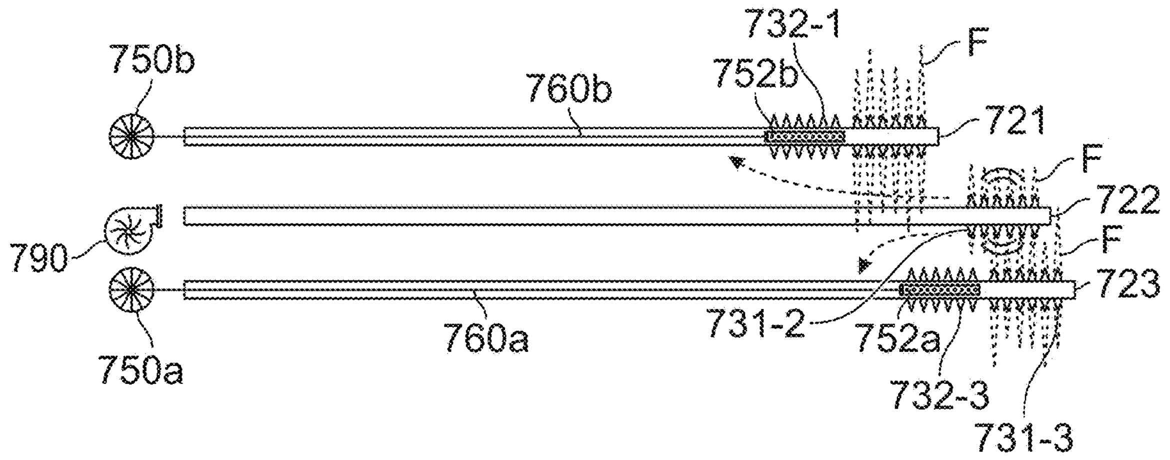

As then shown in FIG. 10B, perforation of the second stage 732-3 of well 723 is performed. As stage 731-2 of well 722 is hydraulically fractured, the second system 750*b* in well 721 is used to detect microseismic events from the fracturing of the first stage 732-1 in well 722, as shown by the dashed arrow. Also, the second system 750*b*, which is in well 721 is used to detect microseismic events from the fracturing of the first stage 732-1 in well 722, as shown by the dashed arrow. Thus, having two monitoring wells for the fracturing of stage 731-2.

It is understood that plugs are also set between the various stages to permit hydraulic fracturing of a specific stage. As will be appreciated, the entire process outlined above can be repeated until a predetermined length, including the entire horizontal sections of the wells 721, 722, 723 have been stimulated. Because the process has two steps that are done in series (i.e., perforating the casing followed by pumping of fracture fluid), it is possible to gain operational efficiency by working on more than one well simultaneously, executing the two operations in parallel. The monitoring of microseismic events during the fracturing operation obtains real-time information about the fracturing of the various stages in the wells. Thus, the present integrated perforation and fiber optic wireline fracture diagnostics systems allow for the accusation of data and use of diagnostics on every well without driving up the total well cost.

Example 6

Figure 11A:
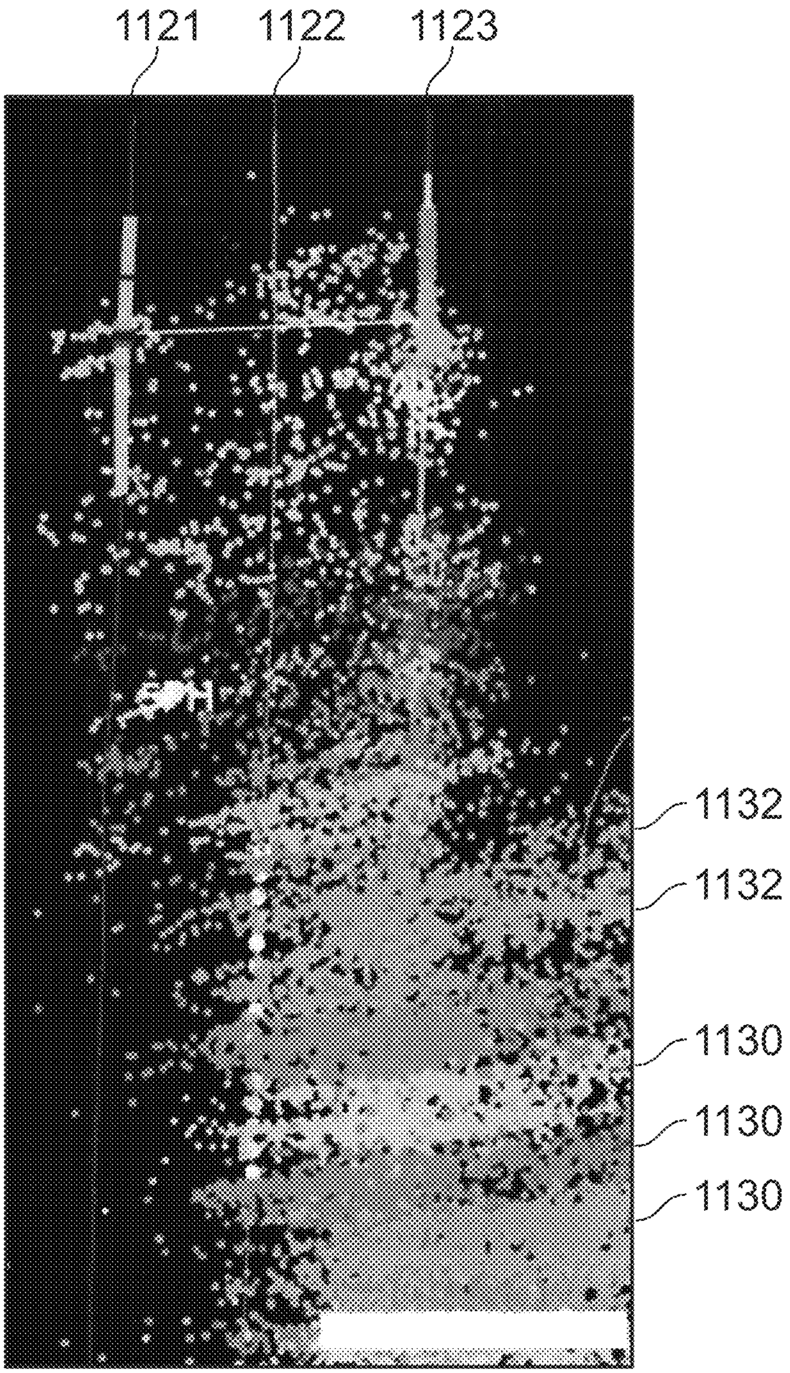
FIG. 11A is a plan view image of an embodiment of three adjacent wells, showing micro-seismic events during fracturing at different stages along one of the wells in accordance with the present inventions.

FIG. 11A is an image of data for three adjacent wells 1121, 1122, 1123, showing micro-seismic events 1132, detected during fracturing at different stages 1130 along well 1123. As will be appreciated, the different stages 1130 of this one well 1123 are not necessarily fractured in straight sequence. Instead, a fracture operation can be performed as outlined above in the Examples. The data shown in FIG. 11A simply isolate the detected events associated with the one well 1123 for separate illustration.

Of particular interest to the present techniques is a determination (visualization and characterization) of cross-well strain observed at one well 1123 while the other well 1121 is being stimulated. Information on the cross-well strain can be observed in real-time during the fracture operations and can be used to directly assess characteristics of the fracturing operations, such as fracture efficiency, fracture lengths, fracture heights, features in the formation, etc. The information about the cross-well strain and microseismic data can also be stored and supplemented with additional analysis and measurements.

Figure 11B:
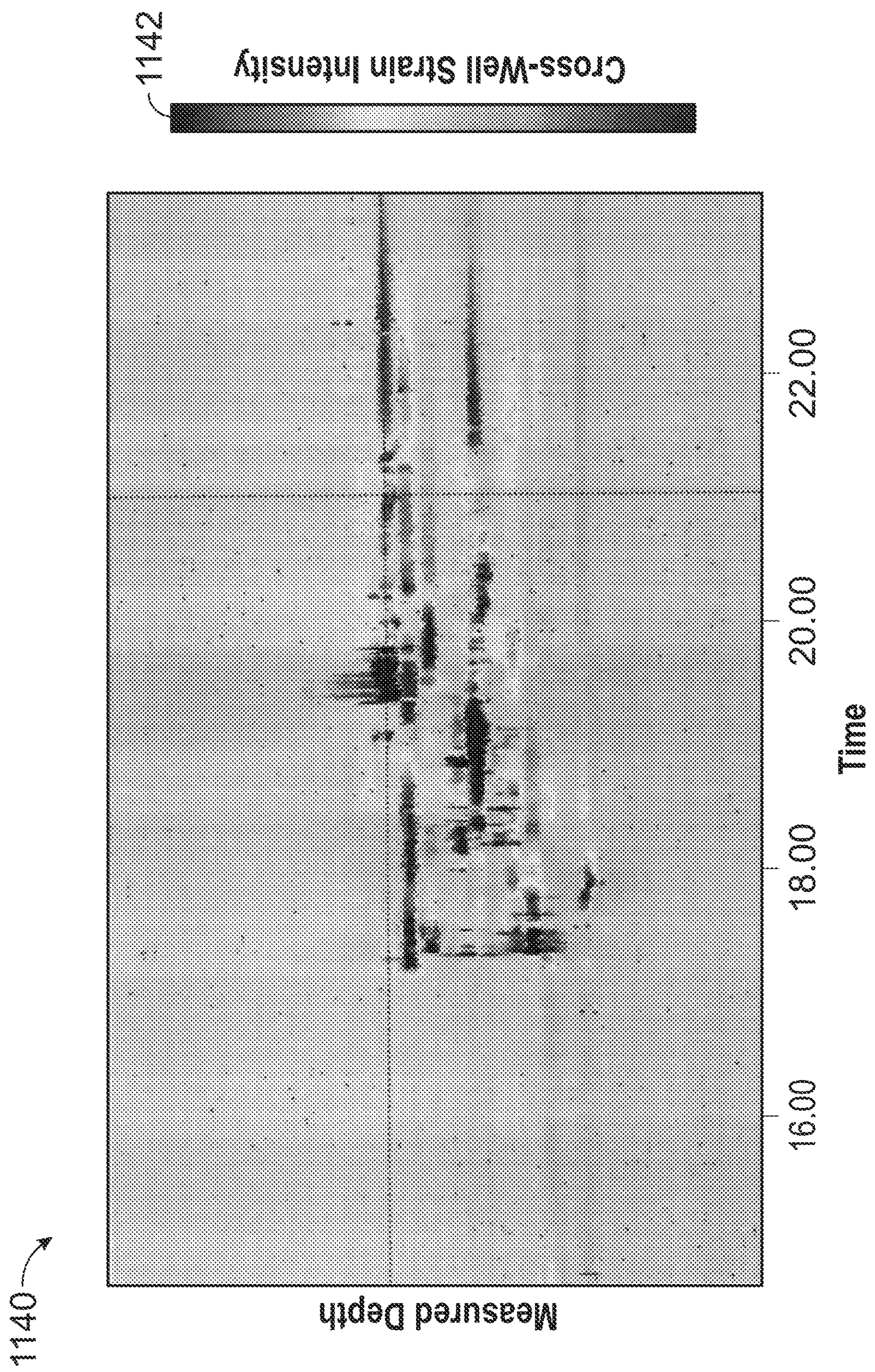
FIG. 11B is an image graphing an embodiment of the intensity of cross-well strain at one well while a stage in another well is fractured in accordance with the present inventions.

In FIG. 11B, there is shown an image 1140 graphing the intensity of cross-well strain 1142 graphing one of the stages of a first well monitored from a second well over time during fracturing of the given stage. The monitoring and perforating system having the perforating gun is held in the second well so the fiber optic wireline can detect measurements as the stage in the first well is fractured. The measurements (deflections, etc.) detected by the fiber optic wireline are processed to show the resulting intensity of the cross-well strain 1142 with respect to time and measured depth. Based on these and other processed results from the measurements, operators can monitor the fracture operations in real-time, determine characteristics of the fractures produced, decipher characteristics of the surrounding formation, and make any number of other assessments. As will be appreciated, downhole formation properties are complex, and acquiring data such as depicted here can be key to understanding completions and optimizing production.

Example 7

Figure 14A:
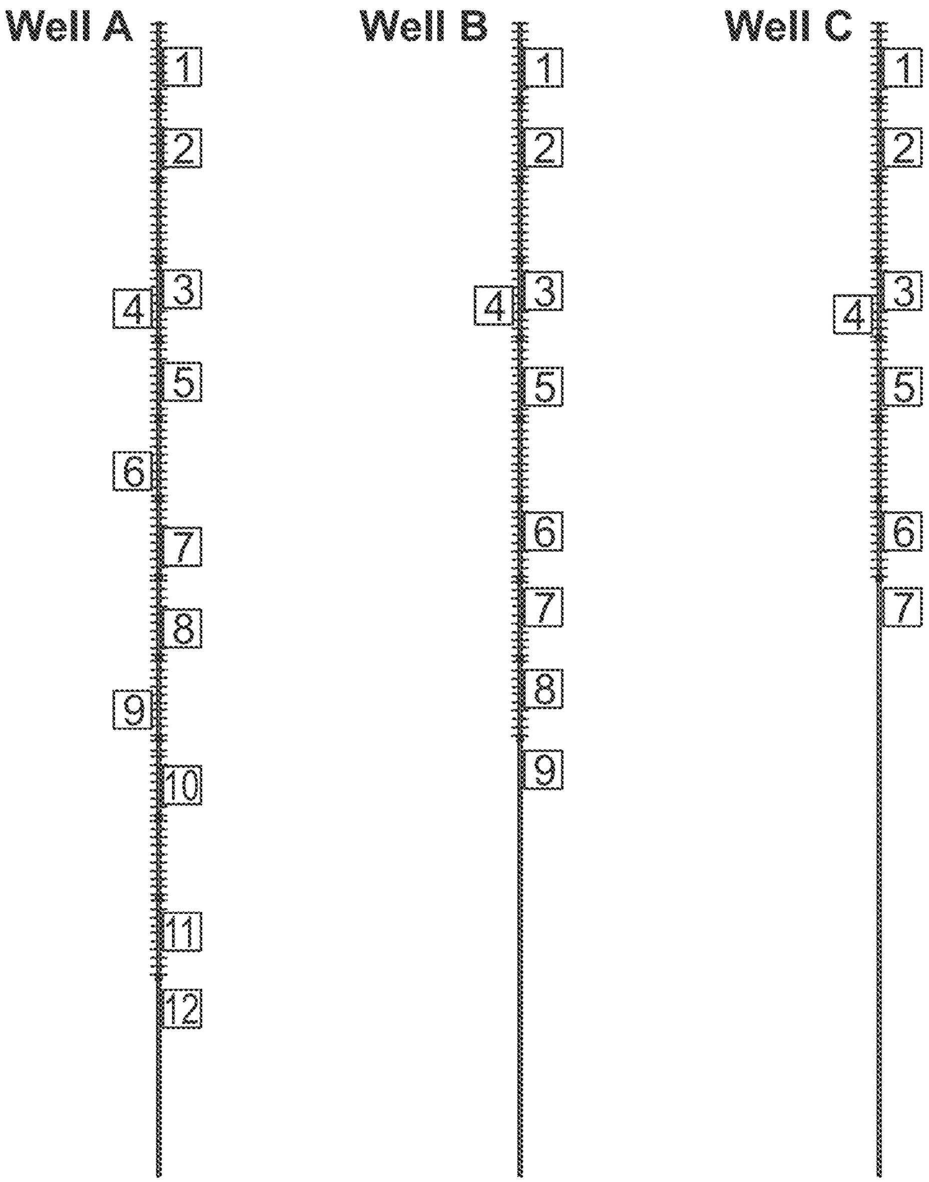
FIGS. 14A to 14D are schematics charting activities for three adjacent wells during an embodiment of a perforating, monitoring and fracturing operation in accordance with the present inventions.

Turning to FIG. 14A there is shown a schematic of 3 wells, in which the present perforating monitoring and fracturing techniques are used. This is an embodiment of a zipper type of fracture and consists of three wells spaced about 660 ft apart completed with a multi-stage plug and perf hydraulic fracture completion. Each stage uses about 150 ft of wellbore length and contains in this example 10 perforation clusters. Separating each stage is a composite frac plug providing hydraulic isolation from the previous stages.

Figure 14B:
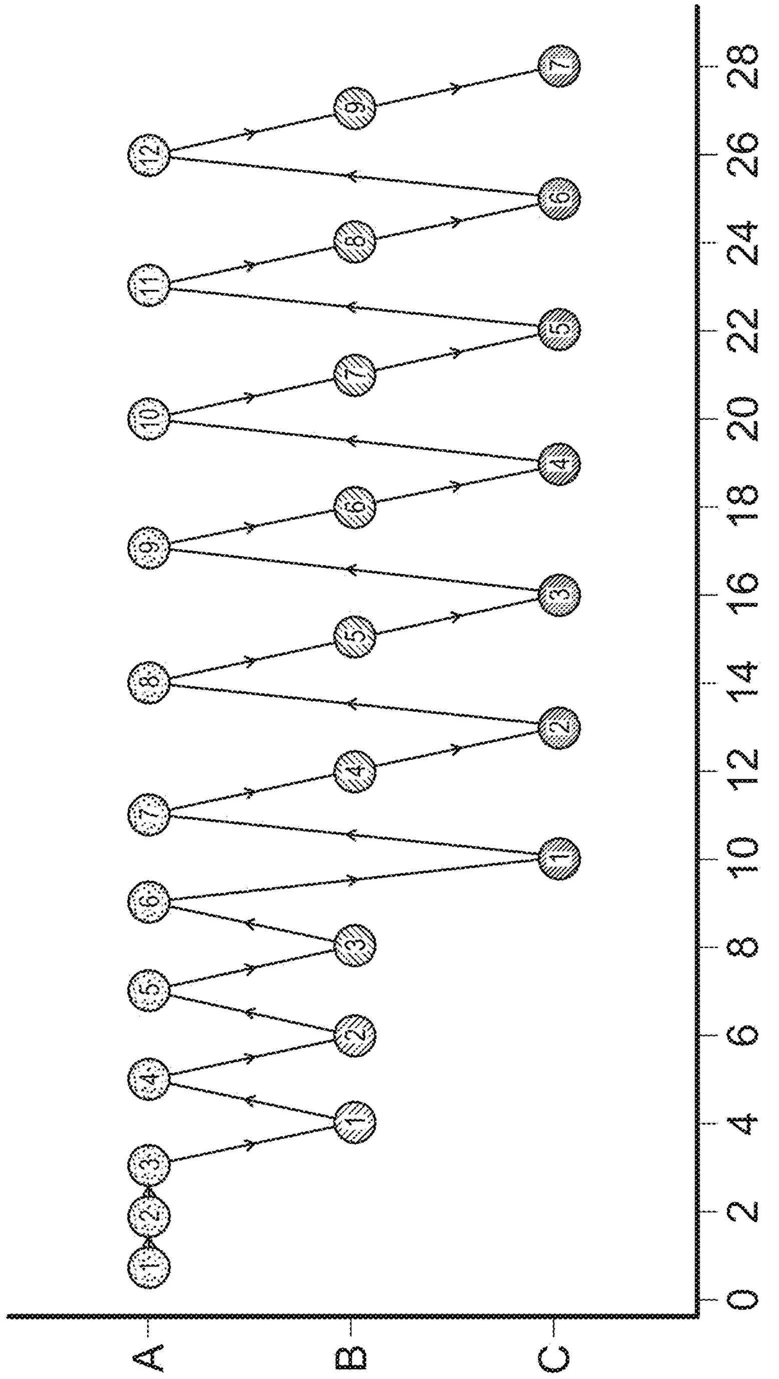

As then shown in FIG. 14B, the first several stages of this well are completed in a specific order that will allow the wireline in well C to be well positioned to monitor Well A and Well B for the remainder of the operation.

Figure 14C:
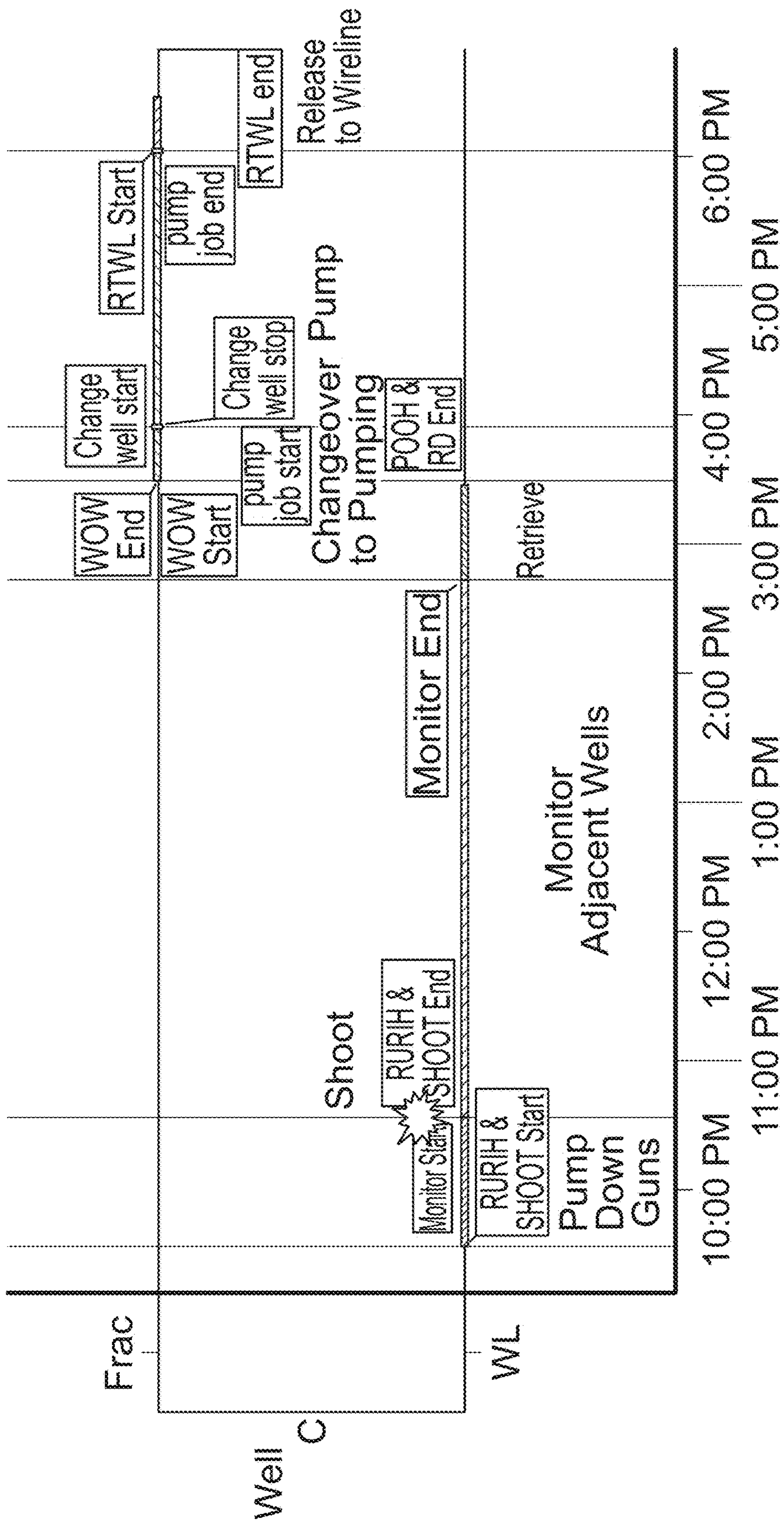

As then shown in FIG. 14C, the operations and approximate time required to complete each operation for the construction of a typical stage require about 8 hours elapsed time with about 3.5 hours of monitoring time after the pert guns fire and before the wireline must be retrieved from the well.

Figure 14D:
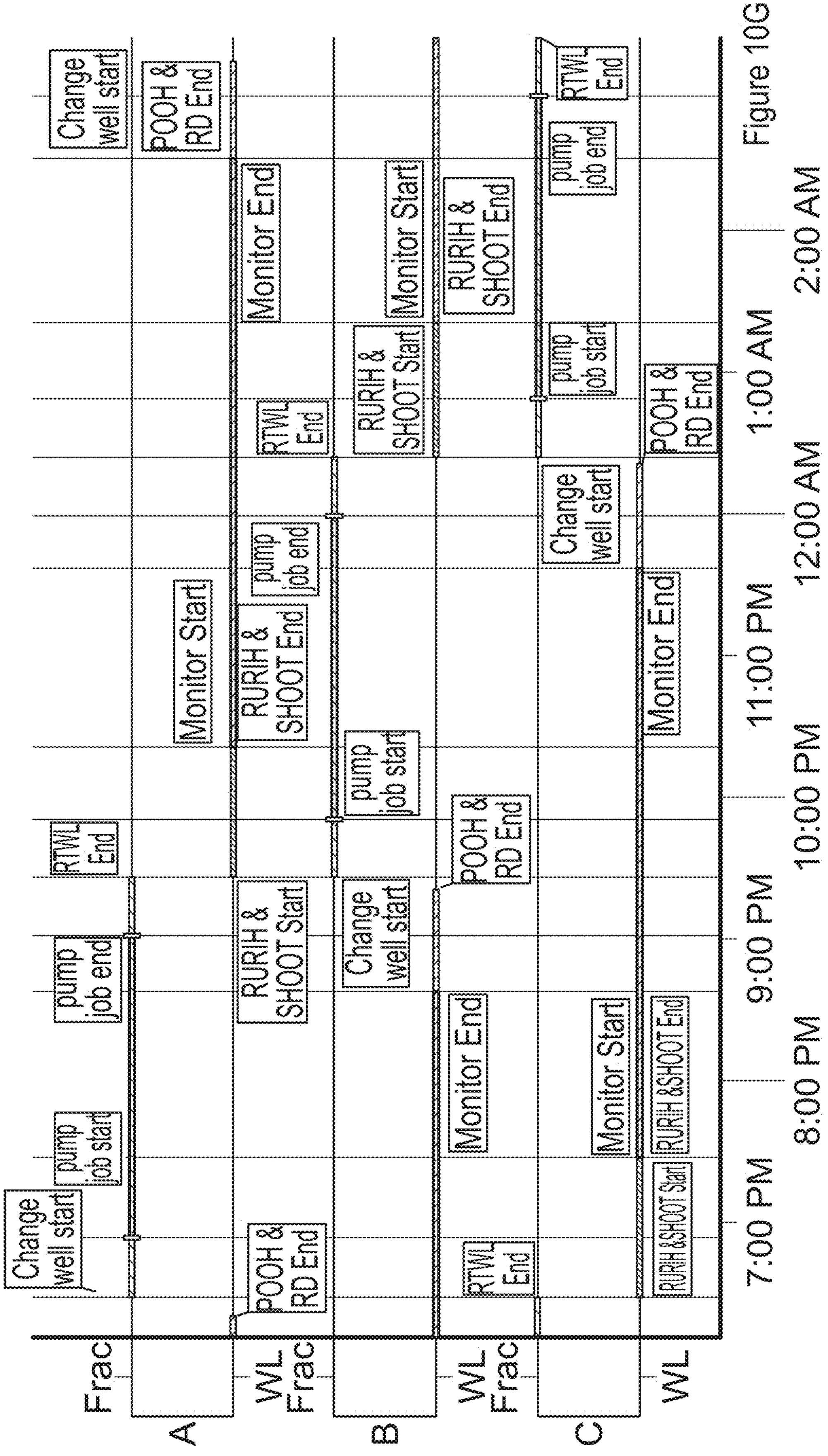

As then shown in FIG. 14D, the operations and approximate time required to complete each operation for the construction of a three consecutively pumped stages one on each of three neighboring wells requires about 8 hours elapsed time. Using the current system, the fracture pumping operation is able to move from one stage to the next without having to wait on the wireline to be retrieved. In this way, the entire stage can be monitored from at least one of the fiber wirelines parked in an adjacent well. This is achieved with no changes in the order of operations or the downhole equipment required other than the fiber contained in the wireline.

Embodiments of the present monitoring and perforating system (e.g., FIG. 2A, FIG. 12, FIG. 13) can conduct the operations of this Example 7.

It is noted that there is no requirement to provide or address the theory underlying the novel and groundbreaking systems, tools and methods, performance or other beneficial features and properties that are the subject of, or associated with, embodiments of the present inventions. Nevertheless, various theories are provided in this specification to further advance the art in this important area, and in particular in the important area of natural resource, and hydrocarbon exploration and production. These theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the methods and processes, conductivities, fractures, drainages, resource production, and function-features of embodiments of the methods, articles, materials, devices and system of the present inventions; and such later developed theories shall not limit the scope of protection afforded the present inventions.

The various embodiments of perforating tool monitoring system, their components, and the operations and methods performed using these systems and components, set forth in this specification may be used for various oil field operations, other mineral and resource recovery fields, as well as other activities and in other fields. Additionally, these embodiments, for example, may be used with: oil field systems, operations or activities that may be developed in the future; and with existing oil field systems, operations or activities which may be modified, in-part, based on the teachings of this specification. Further, the various embodiments set forth in this specification may be used with each other in different and various combinations. Thus, for example, the configurations provided in the various embodiments of this specification may be used with each other. For example, the components of an embodiment having A, A' and B and the components of an embodiment having A", C and D can be used with each other in various combination, e.g., A, C, D, and A, A" C and D, etc., in accordance with the teaching of this specification. Thus, the scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A system for monitoring and perforating a plurality of wells in a hydrocarbon reservoir, the system comprising:

a. a hydraulic fracture monitoring system comprising a computer comprising a processor and a data storage device, and a seismic monitoring system, an acoustic monitoring system or both; wherein the computer is configured to directly monitor information about a change in a formation adjacent to the well during hydraulic fracturing of the formation; and, b. a perforation tool firing system comprising a fire control system configured to generate a firing signal along a fire control line to fire a perforation tool;

c. wherein the hydraulic fracture monitoring system and the perforation tool firing system are contained in a common housing.

2. The system of claim 1, wherein the common housing is a shipping container.

3. The system of claim 1, wherein the common housing is located on a chassis of a vehicle.

4. The system of claim 1, wherein the common housing is located on a wireline truck.

5. The system of claim 1, wherein the system contains a common control system configured to control the hydraulic fracturing monitoring system and the perforation tool firing system.

6. The system of claim 5, wherein the common control system is a control system for a reel.

7. The system of claim 5, wherein the common control system is a control system for a reel, the reel comprising an optical monitoring fiber and fire control line.

8. The system of claim 1, 5 or 7, comprising a perforation tool.

9. The system of claim 1, 5 or 7, comprising a monitoring and perforation tool assembly, comprising a conveyance structure having a perforation tool at its distal end, an optical monitoring fiber configured as a distributed acoustic sensor in optical communication with an optical interrogation device, and a fire control line, in control communication with the perforation tool.

10. The system of claim 1, 5 or 7, further being operably associated with a hydraulic fracturing pump truck.

11. The system of claim 1, 5 or 7, wherein the means to monitor the hydraulic fracturing comprises a seismic monitoring system configured to monitor fractures in a formation.

12. A mobile system for treating a plurality of adjacent wells having casings, the system comprising:

a plurality of wirelines, configured to be removably inserted into a well, each of the plurality of wirelines having at least one optical fiber disposed therealong, the at least one optical fiber being configured as a distributed acoustic sensor, each of the wirelines having a first termination at a first end and having a second termination at a second end, the first termination being configured to couple to perforating equipment;

a plurality of fiber-optic interrogators, each being configured to couple to the second termination of one of the wirelines, each fiber-optic interrogator being configured to interrogate the at least one optical fiber for distributed acoustic sensing data; and, a hydraulic fracture monitoring system comprising a computer comprising a processor and a data storage device, and a seismic monitoring system, an acoustic monitoring system or both; wherein the computer is configured to directly monitor information about a change in a formation adjacent to the well during hydraulic fracturing of the formation.

13. The system of claim 12, further comprising a plurality of perforating guns, each being configured to couple to the first termination of the wirelines and being configured to perforate the casing of the wells.

14. The system of claim 12, further comprising a plurality of plugs, each being configured to set in the casing of the wells.

15. The system of claim 12, 13, or 14, wherein each of the wirelines comprises a communication line; and wherein the system further comprises a plurality of control units, each being configured to control the perforating gun on the wireline via the communication line.

16. The system of claim 12, 13, or 14, further comprising pumping equipment being configured to pump fracture treatment in at least one of the adjacent wells.

17. A mobile system for treating a plurality of adjacent wells having casing, the system comprising:

a wireline configured to be removably inserted into a well, the wireline having at least one optical fiber disposed therealong, the at least one optical fiber being configured as a distributed acoustic sensor, the wireline having a first termination at a first end and having a second termination at a second end, the first termination being configured to couple to perforating equipment;

a fiber-optic interrogator being configured to couple to the second termination of the wireline, the fiber optic interrogator being configured to interrogate the at least one optical fiber for distributed acoustic sensing data;

a hydraulic fracture monitoring system comprising a computer comprising a processor and a data storage device, and a seismic monitoring system, an acoustic monitoring system or both; wherein the computer is configured to directly monitor information about a change in a formation adjacent to the well during hydraulic fracturing of the formation.

18. The system of claim 17 comprising a perforating gun being configured to couple to the first termination and being configured to perforate the casing of the adjacent wells.

19. The system of claim 17 or 18, further comprising a plurality of plugs, each being configured to set in the casing of the wells.

20. The system of claim 17 or 18, wherein the wireline comprises a communication line; and wherein the system further comprises a control unit being configured to control the perforating gun on the wireline via the communication line.

21. The system of claim 17 or 18, further comprising pumping equipment being configured to pump fracture treatment in at least one of the adjacent wells.

* * * * *